(12) United States Patent
Hana et al.

(10) Patent No.: US 11,428,612 B2
(45) Date of Patent: Aug. 30, 2022

(54) ESTIMATION DEVICE AND ESTIMATION METHOD

(71) Applicants: MITSUBISHI ELECTRIC CORPORATION, Tokyo (JP); MITSUBISHI ELECTRIC RESEARCH LABORATORIES, INC., Cambridge, MA (US)

(72) Inventors: Norihiko Hana, Tokyo (JP); Masao Akiyoshi, Tokyo (JP); Dehong Liu, Cambridge, MA (US)

(73) Assignees: MITSUBISHI ELECTRIC CORPORATION, Tokyo (JP); MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 0 days.

(21) Appl. No.: 17/022,833

(22) Filed: Sep. 16, 2020

(65) Prior Publication Data
US 2022/0082482 A1 Mar. 17, 2022

(51) Int. Cl.
*G01N 3/06* (2006.01)
*G01N 3/08* (2006.01)
*G01N 3/20* (2006.01)

(52) U.S. Cl.
CPC ............. *G01N 3/066* (2013.01); *G01N 3/08* (2013.01); *G01N 3/20* (2013.01)

(58) Field of Classification Search
CPC .................................................. G01N 3/066
See application file for complete search history.

(56) References Cited

FOREIGN PATENT DOCUMENTS

| CN | 106777484 A | 5/2017 | |
|---|---|---|---|
| JP | 2005-066646 A | 3/2005 | |
| JP | 2012-159477 A | 8/2012 | |
| JP | 2013-15445 A | 1/2013 | |
| RU | 2748411 C2 * | 5/2021 | ............. G06F 30/20 |
| WO | WO-2017087867 A1 * | 5/2017 | ............... G01N 3/32 |

(Continued)

OTHER PUBLICATIONS

Inoue et al., "Indivdual Identification of Contact Pressure Distribution of Inner and Outer Brake Pad Using Inverse Analysis", JASCOME, vol. 16, No. 24-161202, 2016, 6 pages.

(Continued)

*Primary Examiner* — Jennifer Bahls
(74) *Attorney, Agent, or Firm* — Oblon, McClelland, Maier & Neustadt, L.L.P.

(57) ABSTRACT

A measurement device is configured to set an observation surface on a surface of a structure as a measurement surface to measure a change of the measurement surface as a measurement surface change vector. An estimator is configured to generate an estimation model based on a shape model obtained by modeling a shape of the structure. The estimator is configured to acquire a coefficient vector by solving a norm minimization problem by setting, as parameters, a measurement surface change vector and a part of the estimation model. The coefficient vector forms a sparse solution. The estimator is configured to estimate a change of a crack occurrence surface by determining a candidate surface, which is inside the structure and assumed to have a crack, as the crack occurrence surface, based on the coefficient vector and another part of the estimation model.

15 Claims, 25 Drawing Sheets

(56) References Cited

FOREIGN PATENT DOCUMENTS

| WO | WO 2020/090082 A1 | 5/2020 |
|---|---|---|
| WO | 2020/250339 A1 | 12/2020 |
| WO | 2021/152811 A1 | 8/2021 |

OTHER PUBLICATIONS

International Search Report and Written Opinion dated Jul. 30, 2021 in PCT/JP2021/013160 citing documents AO, AP and AX therein, 16 pages.

Hernandez Eric M.: "Identification of Isolated Structural Damage From Incomplete Spectrum Information Using $l_1$-norm Minimization", Mechanical Systems And Signal Processing, vol. 46, No. 1, XP055827360, May 3, 2014, pp. 59-69.

\* cited by examiner

FIG.8

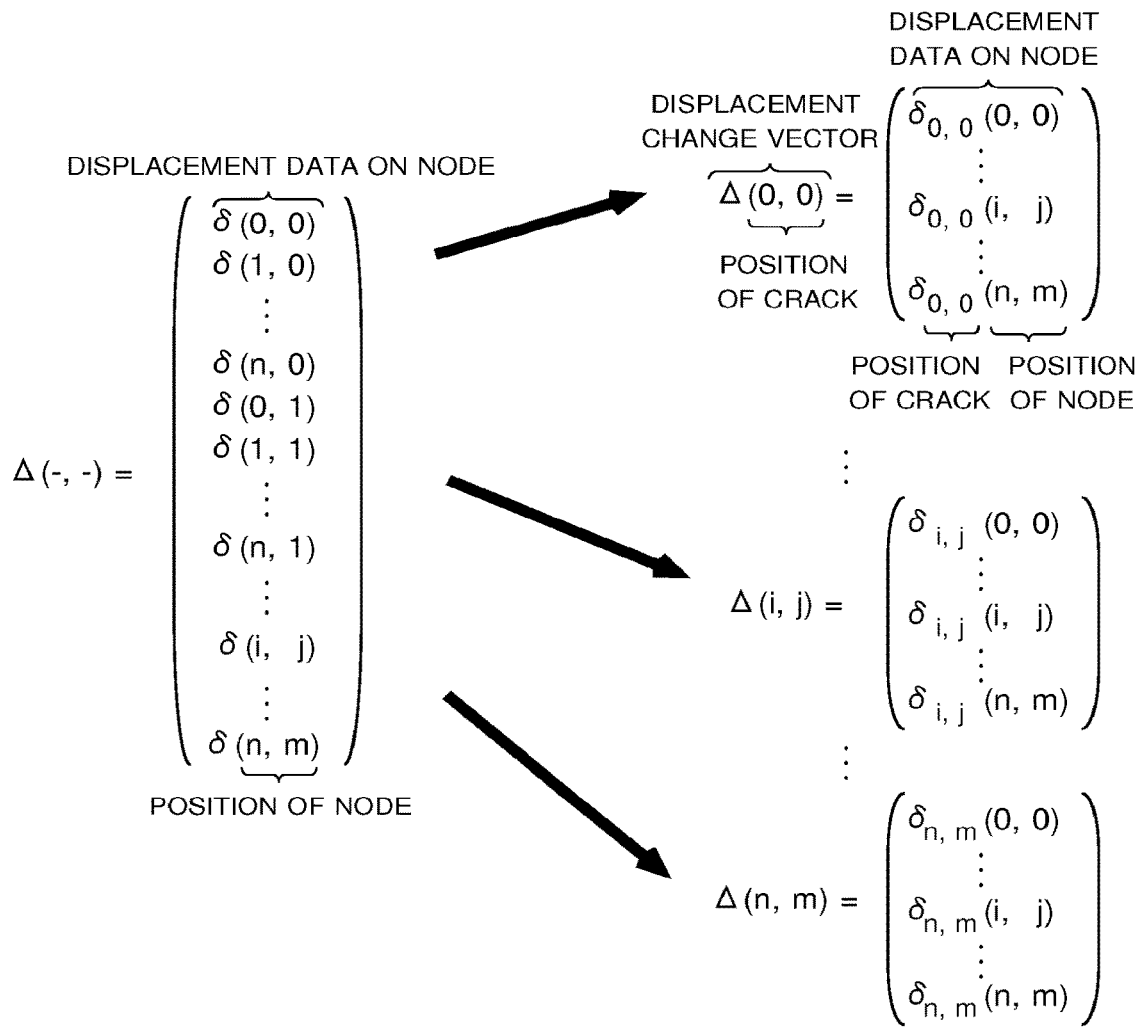

FIG.9

$$\Delta_{crack\_diff}$$
$$= (\ \Delta(0, 0) \ \cdots \ \Delta(i, j) \ \cdots \Delta(n, m)\ )$$

$$= \begin{pmatrix} \delta_{0,0}(0,0) & \cdots & \delta_{i,j}(0,0) & \cdots & \delta_{n,m}(0,0) \\ \vdots & \ddots & \vdots & \ddots & \vdots \\ \delta_{0,0}(i,j) & \cdots & \delta_{i,j}(i,j) & \cdots & \delta_{n,m}(i,j) \\ \vdots & \ddots & \vdots & \ddots & \vdots \\ \delta_{0,0}(n,m) & \cdots & \delta_{i,j}(n,m) & \cdots & \delta_{n,m}(n,m) \end{pmatrix} \quad (1)$$

FIG.10

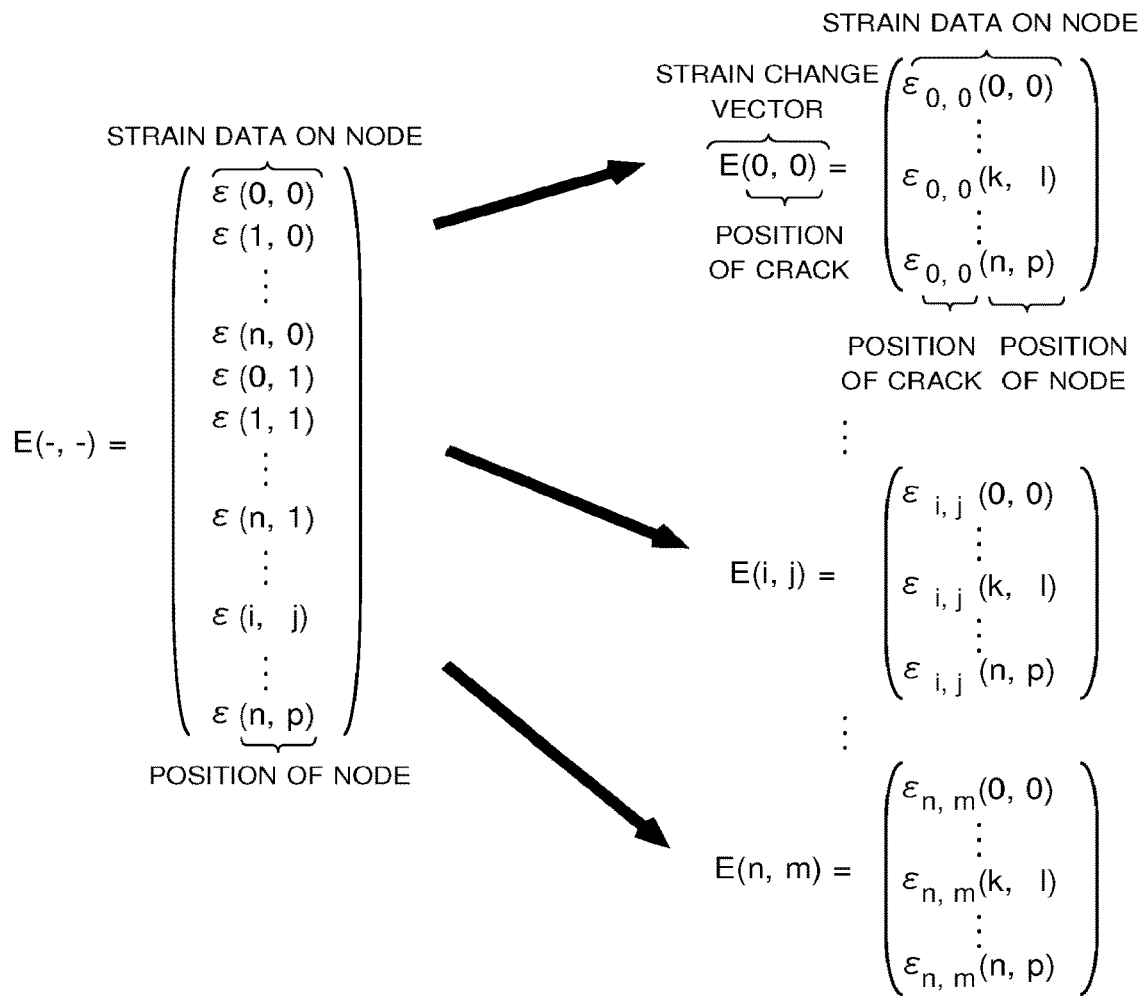

FIG.11

$$E_{measure} = (\ E(0,0) \cdots E(i,j) \cdots E(n,m)\ )$$

$$= \begin{pmatrix} \varepsilon_{0,0}(0,0) & \cdots & \varepsilon_{i,j}(0,0) & \cdots & \varepsilon_{n,m}(0,0) \\ \vdots & \ddots & \vdots & \ddots & \vdots \\ \varepsilon_{0,0}(k,l) & \cdots & \varepsilon_{i,j}(k,l) & \cdots & \varepsilon_{n,m}(k,l) \\ \vdots & \ddots & \vdots & \ddots & \vdots \\ \varepsilon_{0,0}(n,p) & \cdots & \varepsilon_{i,j}(n,p) & \cdots & \varepsilon_{n,m}(n,p) \end{pmatrix} \quad (2)$$

FIG.12

$$E_{measure} = (\; E(0,0) \;\cdots\; E(i,j) \;\cdots\; E(n,m) \;)$$

$$= \begin{pmatrix} \varepsilon_{0,0}(0,0) & \cdots & \varepsilon_{i,j}(0,0) & \cdots & \varepsilon_{n,m}(0,0) \\ \vdots & \ddots & \vdots & & \vdots \\ \varepsilon_{0,0}(k,l) & \cdots & \varepsilon_{i,j}(k,l) & \cdots & \varepsilon_{n,m}(k,l) \\ \vdots & & \vdots & \ddots & \vdots \\ \varepsilon_{0,0}(n,p) & \cdots & \varepsilon_{i,j}(n,p) & \cdots & \varepsilon_{n,m}(n,p) \end{pmatrix} \quad (1)$$

$$d\varepsilon_{crack_{i,j}} = \begin{pmatrix} \varepsilon_{i,j}(0,0) \\ \vdots \\ \varepsilon_{i,j}(n,p) \end{pmatrix} \quad (4) \qquad \tilde{\varepsilon} = \begin{pmatrix} \widetilde{d\varepsilon}_{0*0} \\ \vdots \\ \widetilde{d\varepsilon}_{n*p} \end{pmatrix} \quad (3)$$

$$\frac{d\varepsilon_{crack_{i,j}}^{T} \cdot \tilde{\varepsilon}}{\left| d\varepsilon_{crack_{i,j}}^{T} \right| \cdot \left| \tilde{\varepsilon} \right|} = \gamma \quad (5) \qquad \alpha^{*} = \text{minimize}_{\alpha} \left\| E'_{measure} \cdot \alpha - \tilde{\varepsilon} \right\|_{2}^{2} + \lambda \left\| \alpha \right\|_{1} \quad (8)$$

$$\downarrow \gamma > 0$$

$$E'_{measure} = (\; \cdots,\; d\varepsilon_{crack_{i,j}} \;) \quad (6)$$

$$\Delta_{crack\_ans} = \Delta'_{crack\_diff} \cdot \alpha^{*} \quad (9)$$

$$\Delta'_{crack\_diff} = (\; \cdots,\; d\delta_{crack\_diff_{i,j}} \;) \quad (7)$$

$$\Delta_{crack\_diff} = (\; \Delta(0,0) \;\cdots\; \Delta(i,j) \;\cdots\; \Delta(n,m) \;)$$

$$= \begin{pmatrix} \delta_{0,0}(0,0) & \cdots & \delta_{i,j}(0,0) & \cdots & \delta_{n,m}(0,0) \\ \vdots & \ddots & \vdots & & \vdots \\ \delta_{0,0}(i,j) & \cdots & \delta_{i,j}(i,j) & \cdots & \delta_{n,m}(i,j) \\ \vdots & & \vdots & \ddots & \vdots \\ \delta_{0,0}(n,m) & \cdots & \delta_{i,j}(n,m) & \cdots & \delta_{n,m}(n,m) \end{pmatrix} \quad (2)$$

FIG.26

$$\text{Dis}(-,-) = \begin{pmatrix} d(0,0) \\ d(1,0) \\ \vdots \\ d(n,0) \\ d(0,1) \\ d(1,1) \\ \vdots \\ d(n,1) \\ \vdots \\ d(i,j) \\ \vdots \\ d(n,p) \end{pmatrix}$$

DISPLACEMENT DATA ON NODE

POSITION OF NODE

DISPLACEMENT CHANGE VECTOR $$\overbrace{\text{Dis}(0,0)}^{} = \overbrace{\begin{pmatrix} d_{0,0}(0,0) \\ \vdots \\ d_{0,0}(k,l) \\ \vdots \\ d_{0,0}(n,p) \end{pmatrix}}^{\text{DISPLACEMENT DATA ON NODE}}$$

POSITION OF CRACK

POSITION OF CRACK   POSITION OF NODE $$\text{Dis}(i,j) = \begin{pmatrix} d_{i,j}(0,0) \\ \vdots \\ d_{i,j}(k,l) \\ \vdots \\ d_{i,j}(n,p) \end{pmatrix}$$

$$\text{Dis}(n,m) = \begin{pmatrix} d_{n,m}(0,0) \\ \vdots \\ d_{n,m}(k,l) \\ \vdots \\ d_{n,m}(n,p) \end{pmatrix}$$

FIG.27

$$\text{Dis}_{\text{measure}} = (\text{Dis}(0,0) \cdots \text{Dis}(i,j) \cdots \text{Dis}(n,m))$$

$$= \begin{pmatrix} d_{0,0}(0,0) & \cdots & d_{i,j}(0,0) & \cdots & d_{n,m}(0,0) \\ \vdots & \ddots & \vdots & \ddots & \vdots \\ d_{0,0}(k,l) & \cdots & d_{i,j}(k,l) & \cdots & d_{n,m}(k,l) \\ \vdots & \ddots & \vdots & \ddots & \vdots \\ d_{0,0}(n,p) & \cdots & d_{i,j}(n,p) & \cdots & d_{n,m}(n,p) \end{pmatrix} \quad (10)$$

FIG.28

$$A(-,-) = \begin{pmatrix} \overbrace{a(0,0)}^{\text{ANGLE DATA ON NODE}} \\ a(1,0) \\ \vdots \\ a(n,0) \\ a(0,1) \\ a(1,1) \\ \vdots \\ a(n,1) \\ \vdots \\ a(i,j) \\ \vdots \\ \underbrace{a(n,p)}_{\text{POSITION OF NODE}} \end{pmatrix}$$

$$A(0,0) = \underbrace{\begin{pmatrix} a_{0,0}(0,0) \\ \vdots \\ a_{0,0}(k,l) \\ \vdots \\ a_{0,0}(n,p) \end{pmatrix}}_{\substack{\text{POSITION POSITION} \\ \text{OF CRACK OF NODE}}} \overbrace{\phantom{aaaaa}}^{\text{ANGLE DATA ON NODE}}$$

ANGLE CHANGE VECTOR, POSITION OF CRACK $$A(i,j) = \begin{pmatrix} a_{i,j}(0,0) \\ \vdots \\ a_{i,j}(k,l) \\ \vdots \\ a_{i,j}(n,p) \end{pmatrix}$$

$$A(n,m) = \begin{pmatrix} a_{n,m}(0,0) \\ \vdots \\ a_{n,m}(k,l) \\ \vdots \\ a_{n,m}(n,p) \end{pmatrix}$$

FIG.29

$$A_{\text{measure}} = \begin{pmatrix} A(0,0) & \cdots & A(i,j) & \cdots & A(n,m) \end{pmatrix}$$

$$= \begin{pmatrix} a_{0,0}(0,0) & \cdots & a_{i,j}(0,0) & \cdots & a_{n,m}(0,0) \\ \vdots & \ddots & \vdots & \ddots & \vdots \\ a_{0,0}(k,l) & \cdots & a_{i,j}(k,l) & \cdots & a_{n,m}(k,l) \\ \vdots & \ddots & \vdots & \ddots & \vdots \\ a_{0,0}(n,p) & \cdots & a_{i,j}(n,p) & \cdots & a_{n,m}(n,p) \end{pmatrix} \quad (11)$$

FIG.30

$$Z(-,-) = \begin{pmatrix} \zeta(0,0) \\ \zeta(1,0) \\ \vdots \\ \zeta(n,0) \\ \zeta(0,1) \\ \zeta(1,1) \\ \vdots \\ \zeta(n,1) \\ \vdots \\ \zeta(i,j) \\ \vdots \\ \underbrace{\zeta(n,m)}_{\text{POSITION OF NODE}} \end{pmatrix}$$

$$Z(0,0) = \begin{pmatrix} \zeta_{0,0}(0,0) \\ \vdots \\ \delta_{0,0}(i,j) \\ \vdots \\ \zeta_{0,0}(n,m) \end{pmatrix} \begin{matrix} \text{LOAD DATA} \\ \text{ON NODE} \end{matrix}$$

LOAD CHANGE VECTOR — $Z(0,0)$
POSITION OF CRACK

POSITION OF CRACK    POSITION OF NODE $$Z(i,j) = \begin{pmatrix} \zeta_{i,j}(0,0) \\ \vdots \\ \zeta_{i,j}(i,j) \\ \vdots \\ \zeta_{i,j}(n,m) \end{pmatrix}$$

$$Z(n,m) = \begin{pmatrix} \zeta_{n,m}(0,0) \\ \vdots \\ \zeta_{n,m}(i,j) \\ \vdots \\ \zeta_{n,m}(n,m) \end{pmatrix}$$

FIG.31

$$\begin{aligned}
Z_{crack\_diff} &= (\, Z(0,0) \;\cdots\; Z(i,j) \;\cdots\; Z(n,m) \,) \\
&= \begin{pmatrix} \zeta_{0,0}(0,0) & \cdots & \zeta_{i,j}(0,0) & \cdots & \zeta_{n,m}(0,0) \\ \vdots & \ddots & \vdots & \ddots & \vdots \\ \zeta_{0,0}(i,j) & \cdots & \zeta_{i,j}(i,j) & \cdots & \zeta_{n,m}(i,j) \\ \vdots & \ddots & \vdots & \ddots & \vdots \\ \zeta_{0,0}(n,m) & \cdots & \zeta_{i,j}(n,m) & \cdots & \zeta_{n,m}(n,m) \end{pmatrix}
\end{aligned} \quad (12)$$

ESTIMATION DEVICE AND ESTIMATION METHOD

BACKGROUND OF THE INVENTION

1. Field of the Invention

This disclosure relates to an estimation device and an estimation method.

2. Description of the Related Art

In general, a crack caused inside a rotator structure of a rotary electric machine to be applied to a turbine generator cannot be inspected with eyes, and thus there is a fear in that the crack is not detected in a usual inspection to result in expansion thereof, and the lifetime of the structure, for example, the turbine generator having the rotator structure, is affected disadvantageously.

In view of this, hitherto, there has been known a crack size estimation method being a non-destructive inspection method involving measuring strain of a surface of a structure to inspect a crack caused inside the structure (e.g., refer to Japanese Patent Application Laid-open No. 2012-159477).

The above-mentioned crack size estimation method easily achieves downsizing of an apparatus compared to other non-destructive inspection methods, such as an ultrasonic inspection method or an X-ray inspection method, which enables cost reduction.

However, the above-mentioned crack size estimation method is not a method of directly measuring a crack caused inside the structure.

The above-mentioned crack size estimation method uses inverse analysis of deriving a crack caused inside the structure based on a change in shape of the surface of the structure, to thereby estimate a position and size of the crack caused inside the structure.

An inverse problem is required to be solved to perform inverse analysis. In order to solve the inverse problem, the following three conditions are required to be satisfied. Specifically, the solution of the inverse problem is required to be uniquely determined as uniqueness of the solution, the solution of the inverse problem is required to exist as existence of the solution, and stability of the inverse problem is required to be achieved as stability of the solution.

However, those three conditions, namely, the uniqueness of the solution, the existence of the solution, and the stability of the solution may not be satisfied depending on the results of measurements of strain.

When at least one condition is not satisfied among the above-mentioned three conditions, the inverse problem becomes an ill-posed problem, namely, an inappropriate problem. As a result, the accuracy of estimating the crack deteriorates.

SUMMARY OF THE INVENTION

This disclosure has been made to solve the above-mentioned problem, and has an object to acquire an estimation device and an estimation method, which are capable of accurately estimating a crack caused inside a structure.

According to at least one embodiment of this disclosure, there is provided an estimation device including: a measurement device configured to set an observation surface on a surface of a structure as a measurement surface to measure a change of the measurement surface as a measurement surface change vector; and an estimator configured to estimate a change of a crack occurrence surface by determining a candidate surface, which is inside the structure and assumed to have a crack, as the crack occurrence surface, based on: a coefficient vector forming a sparse solution acquired by solving a norm minimization problem by setting, as parameters, the measurement surface change vector and a part of an estimation model, which is generated from a shape model obtained by modeling a shape of the structure; and another part of the estimation model.

According to at least one embodiment of this disclosure, the crack caused inside the structure can be accurately estimated.

BRIEF DESCRIPTION OF THE DRAWINGS

FIG. 8 is a diagram for illustrating a displacement change vector indicating a difference being a displacement change of each node for each position of a crack on the candidate surface of FIG. 5.

FIG. 9 is a diagram for illustrating a crack surface matrix including the plurality of displacement change vectors of FIG. 8.

FIG. 10 is a diagram for illustrating a strain change vector indicating a difference in strain of each node on the observation surface of FIG. 7 for each position of the crack on the candidate surface of FIG. 5.

FIG. 11 is a diagram for illustrating a measurement surface matrix including the plurality of strain change vectors of FIG. 10.

FIG. 12 is a diagram for illustrating each expression to be processed by a crack state estimator of FIG. 1.

FIG. 26 is a diagram for illustrating a displacement change vector indicating a difference being a displacement change of each node on the observation surface for each position of a crack on the candidate surface in a third embodiment of this disclosure.

FIG. 27 is a diagram for illustrating a measurement surface matrix including the plurality of displacement change vectors of FIG. 26.

FIG. 28 is a diagram for illustrating an angle change vector indicating an angle of each node on the observation surface for each position of a crack on the candidate surface in the third embodiment.

FIG. 29 is a diagram for illustrating a measurement surface matrix including the plurality of angle change vectors of FIG. 28.

FIG. 30 is a diagram for illustrating a load change vector indicating a load on each node for each position of a crack on the candidate surface in a fourth embodiment of this disclosure.

FIG. 31 is a diagram for illustrating a crack surface matrix including the plurality of load change vectors of FIG. 30.

DESCRIPTION OF THE EMBODIMENTS

First Embodiment

Figure 1:
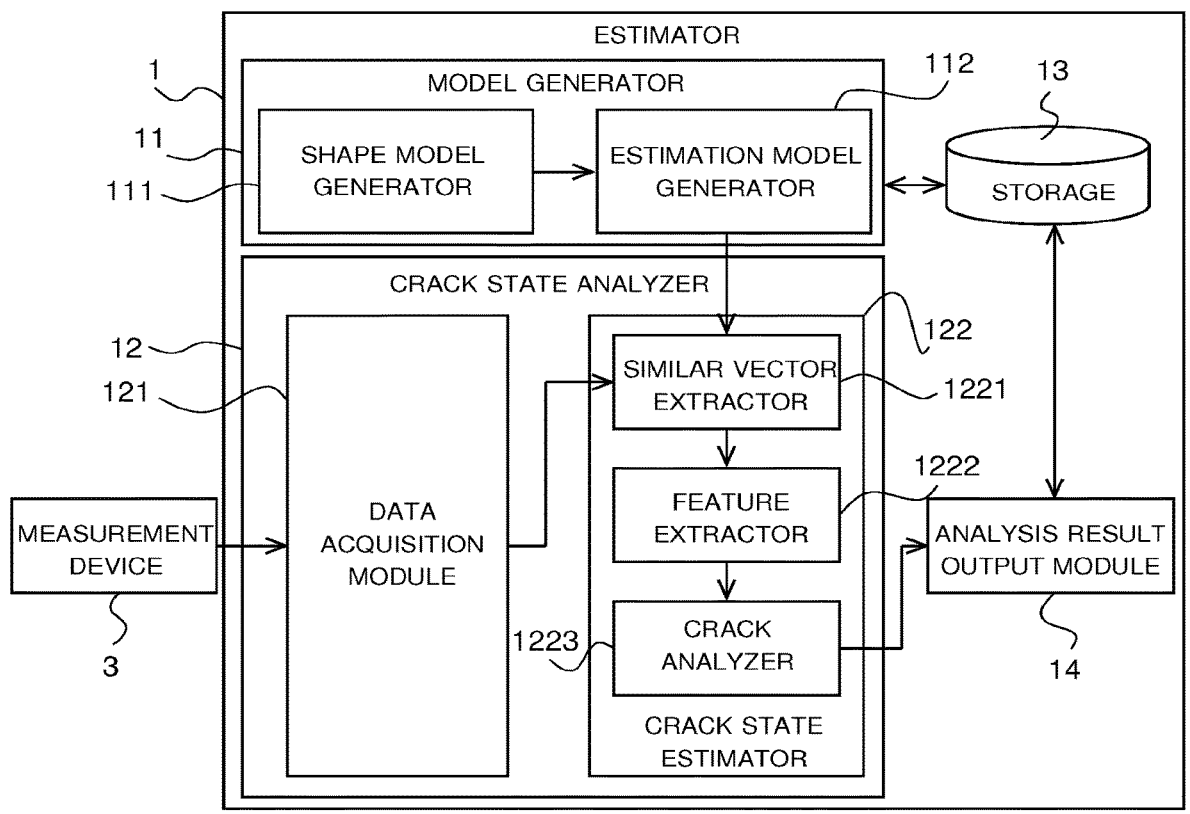
FIG. 1 is a block diagram for illustrating an example of a configuration of an estimation device according to a first embodiment of this disclosure.
Figure 2:
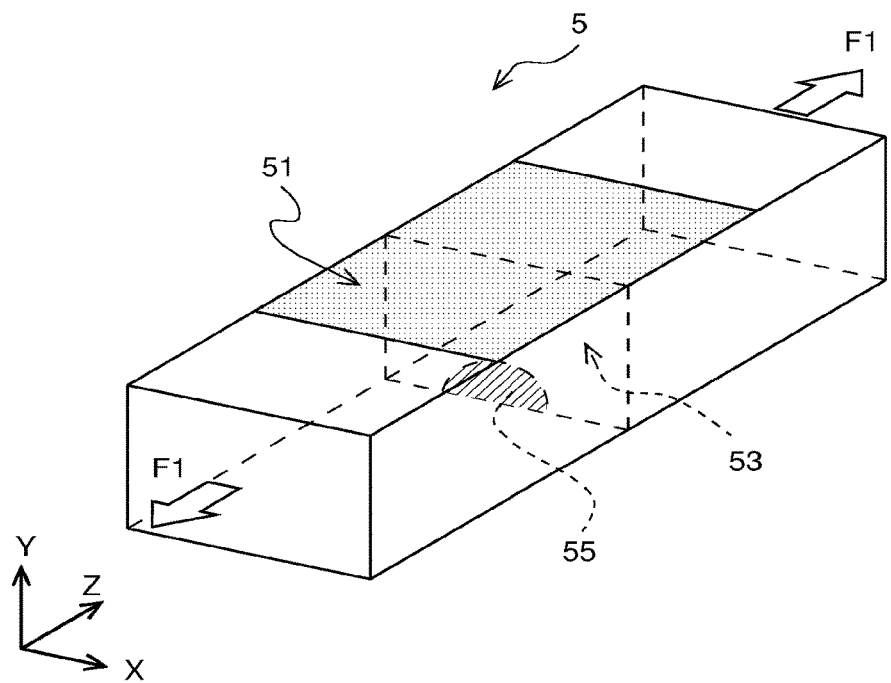
FIG. 2 is a diagram for illustrating an example of a state in which a tensile load is applied to a plate being a structure to be subjected to estimation by the estimation device of FIG. 1.
Figure 3:
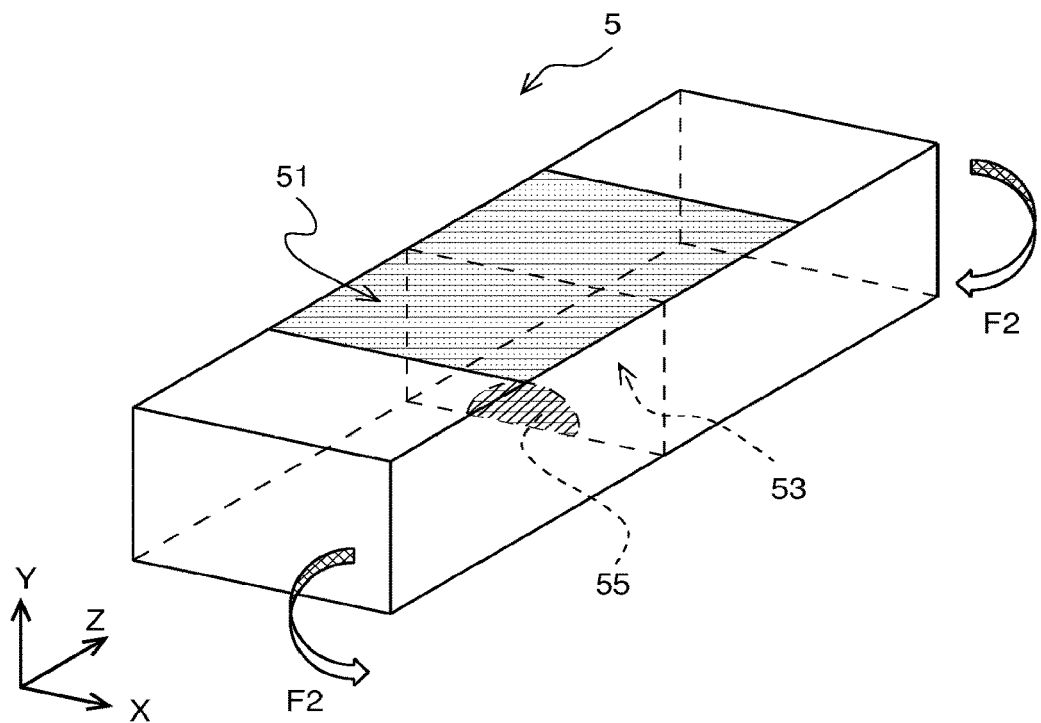
FIG. 3 is a diagram for illustrating an example of a state in which a bending moment is applied to the plate of FIG. 2.

FIG. 1 is a block diagram for illustrating an example of a configuration of an estimation device according to a first embodiment of this disclosure. FIG. 2 is a diagram for illustrating an example of a state in which a tensile load F1 is applied to a plate 5 being a structure to be subjected to estimation by the estimation device of FIG. 1. FIG. 3 is a diagram for illustrating an example of a state in which a bending moment F2 is applied to the plate 5 of FIG. 2.

As illustrated in FIG. 1, the estimation device includes a measurement device 3 and an estimator 1. The position and the size of a crack 55 on the plate 5 of FIG. 2 are estimated by the estimator 1.

A candidate surface 53 can be set inside the plate 5. Further, an observation surface 51 can be set on the surface of the plate 5. In FIG. 2 and FIG. 3, the plate 5 is represented in an orthogonal coordinate system. The candidate surface 53 is set to a position at which the crack 55 is assumed to occur. The observation surface 51 is set within such a range that the surface of the plate 5 changes due to a change of the candidate surface 53.

The measurement device 3 is configured to set at least a part of the surface of the plate 5 as the observation surface 51 to measure a change of the surface of the observation surface 51. The measurement device 3 includes a strain gauge, for example. The strain gauge is mounted to the observation surface 51 to be used.

The strain gauge is formed of a base material and a resistance material. The base material is formed of an electrical insulator. The resistance material is mounted on the base material. In the base material, a lead-out line is provided at a portion protruding from the base material. The base material is mounted on the surface of the plate 5 with an adhesive. With such a mounting structure, when the base material expands or contracts, the resistance material also expands or contracts, and the electrical resistance of the resistance material changes. The lead-out line is connected to the estimator 1.

For example, when strain occurs on the surface of the plate 5, the resistance material expands or contracts, and thus the electrical resistance of the resistance material changes. The change of the electrical resistance is transferred to the estimator 1 via the lead-out line. As a result, the strain gauge measures a change in strain of the surface of the plate 5, and supplies the measurement result to the estimator 1.

In short, the measurement device 3 measures the change in strain of the observation surface 51, which is on the surface of the plate 5, with the tensile load F1 of FIG. 2 or the bending moment F2 of FIG. 3 being applied to the plate 5.

The measurement device 3 measures, as a measurement surface change vector, a change of the measurement surface by setting the observation surface 51 as the measurement surface, and details of this processing are described later.

The estimator 1 is configured to estimate the crack 55 inside the plate 5 based on the change of the measurement surface measured by the measurement device 3. That is, the estimator 1 estimates the crack 55 inside the plate 5 by performing inverse analysis that uses a relationship between the change in shape of the surface of the plate 5 and the crack 55 inside the plate 5.

Specifically, various kinds of phases to be processed by the estimator 1 include a learning phase and an inverse analysis phase serving as a utilization phase. The inverse analysis phase is processed by the estimator 1 after the learning phase.

In the learning phase, a relationship between the crack 55 inside the plate 5 and a change in shape of the surface of the plate 5 is prepared as learning data in advance. Further, in the inverse analysis phase, learning data prepared in the learning phase is used to estimate the position and size of the crack 55 inside the plate 5.

The learning data and a least squares method are usually used for such estimation, and thus a pseudo-inverse matrix is required to be acquired. With this, such estimation is reduced to solving an inverse problem. In order to solve the inverse problem, three conditions, namely, uniqueness of the solution, existence of the solution, and stability of the solution are required to be satisfied.

However, the above-mentioned three conditions may not be satisfied depending on the learning data and the results of measuring strain of the measurement surface by the measurement device 3.

For example, when the number of unknown variables is larger than that of observed values, there are an infinite number of solutions, and thus uniqueness of the solution is not satisfied.

Further, for example, when the number of unknown variables is smaller than that of observed values, there is no solution, and thus existence of the solution is not satisfied.

Further, for example, even in a case where strain occurs on the plate 5 due to stress on the plate 5, when influence of the strain rapidly attenuates as the influence becomes away from a location at which the strain has occurred, stability of the solution is not satisfied.

Thus, the inverse problem may become an ill-posed problem, namely, an inappropriate problem.

Therefore, even when the position and size of the crack 55 are estimated by using the learning data, there may be no pseudo-inverse matrix in such an inappropriate problem.

In view of this, in the first embodiment, the estimator 1 models the shape of the plate 5 to acquire a shape model. The estimator 1 generates an estimation model based on the shape model. The estimator 1 acquires a coefficient vector forming a sparse solution by solving a norm optimization problem by setting, as parameters, a part of the estimation model and the measurement surface change vector serving. The estimator 1 estimates the change of the crack occurrence surface by setting the candidate surface 53 as a crack occurrence surface based on the coefficient vector and another part of the estimation model.

Specifically, the estimator 1 includes a model generator 11, a crack state analyzer 12, a storage 13, and an analysis result output module 14.

The model generator 11 includes a shape model generator 111 and an estimation model generator 112.

The shape model generator 111 is configured to generate a shape model. The estimation model generator 112 is configured to generate a structure analysis model based on the shape model. The estimation model generator 112 is configured to generate an estimation model based on the structure analysis model.

The generated estimation model is different depending on the structure analysis model. The structure analysis model is a model used at the time of performing structure analysis. The structure analysis model and a boundary condition for the structure analysis model are required in order to perform structure analysis.

The boundary condition includes a load condition and a constraint condition. Three conditions, namely, the structure analysis model, the load condition, and the constraint condition are required in order to perform structure analysis.

Thus, a load condition and a constraint condition are defined when structure analysis is performed by using the structure analysis model.

The load condition defines information on a location of the structure to which a load is applied, and a magnitude of the load, namely, information on a force vector at the location to which the load is applied in the structure model.

Meanwhile, the constraint condition defines information on a location of the structure to be supported and how the location is to be supported, namely, information that sets the amount of deformation at the location supported in the structure analysis model to zero.

The boundary condition is a condition that is different depending on the generated shape model.

The shape model is a model of an object to be inspected, which is generated as the entire plate 5 or a part of the plate 5 based on the measurement surface and the crack occurrence surface.

When the entire plate 5 is set as a shape model, a temperature distribution may be added as the boundary condition.

The temperature distribution is used in the following manner. First, known information on a uniform temperature distribution is applied to the structure analysis model as a load under a set initial temperature. Next, structure analysis is performed by causing, under an analysis temperature different from the set initial temperature, the entire plate 5 to expand or contract due to a difference between the initial temperature and the analysis temperature.

Meanwhile, when a part of the plate 5 is set as the shape model, information on displacement change of a surface cut out as the part of the plate 5 and information on a load distribution are given as the boundary condition.

In this manner, when structure analysis is performed based on the boundary condition, a model in which the measurement surface and crack occurrence surface of the shape model are divided into lattices is used as the structure analysis model.

Thus, the crack occurrence surface is generated as a part of the structure analysis model by dividing the candidate surface 53 into lattices. Further, the measurement surface is generated as another part of the structure analysis model by dividing the observation surface 51 into lattices.

Figure 4:
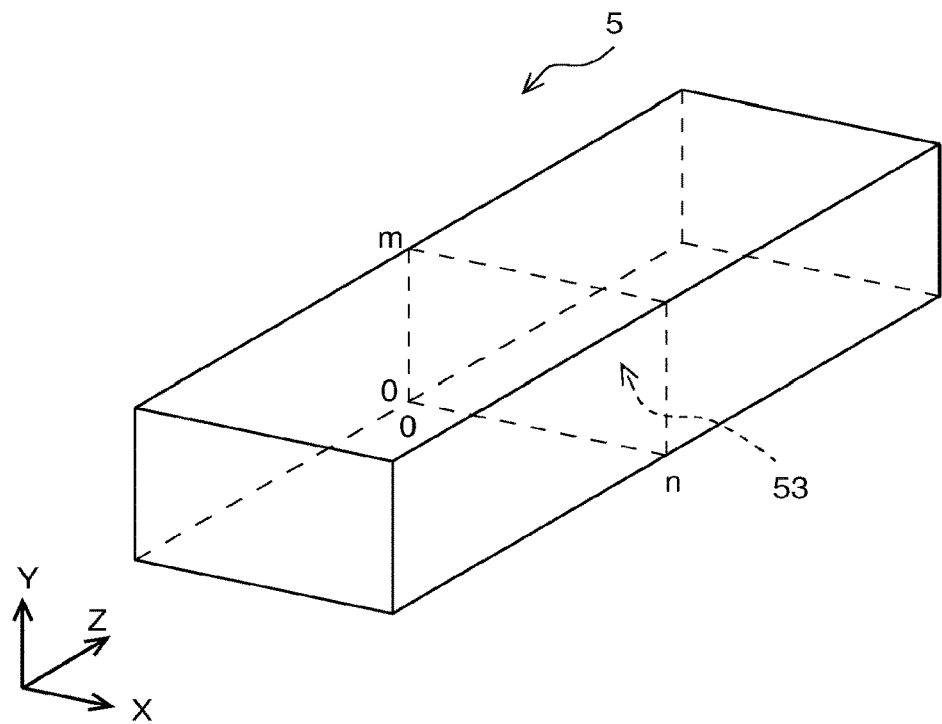
FIG. 4 is a diagram for illustrating an example of reference coordinates set for candidate surfaces of FIG. 2 and FIG. 3.
Figure 5:
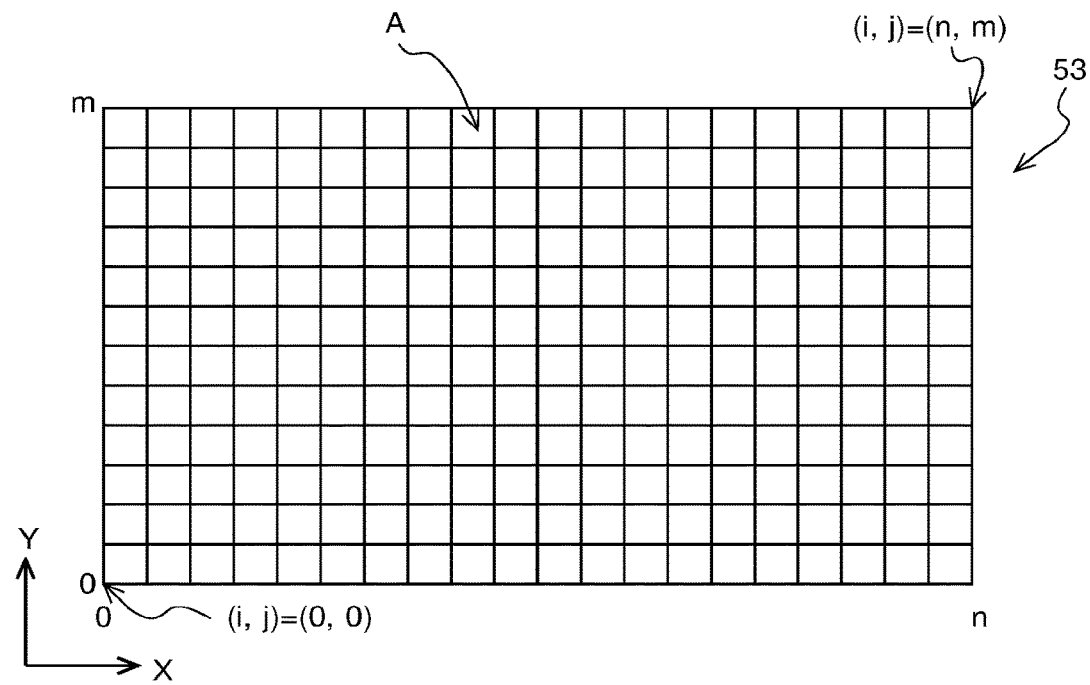
FIG. 5 is a diagram for illustrating an example of each section at a time of division of the candidate surface of FIG. 4.

FIG. 4 is a diagram for illustrating an example of reference coordinates set for the candidate surfaces 53 of FIG. 2 and FIG. 3. FIG. 5 is a diagram for illustrating an example of each section A at a time of division of the candidate surface 53 of FIG. 4.

As illustrated in FIG. 5, the crack occurrence surface of the structure analysis model is divided into a plurality of sections A. Each section A is acquired by dividing the crack occurrence surface into n sections along an X-axis direction and dividing each of those n sections into m sections along a Y-axis direction.

In other words, the crack occurrence surface in the shape model is divided into n(horizontal)×m(vertical) lattices, and as a result, those lattices intersect with each other and the plurality of sections A are created on the crack occurrence surface of the structure analysis model.

Coordinates of each lattice are represented by (i, j). The origin of (i, j) is (0, 0). A position of the maximum coordinates of (i, j) is (n, m). When each lattice is set as a node, each node is a point on a line forming the section A.

Structure analysis of the crack occurrence surface is performed for each position of each node on the crack occurrence surface.

For example, when the crack 55 occurs at a node at the position of (0, 0) on the crack occurrence surface, structure analysis is performed for displacement changes of all the nodes on the crack occurrence surface, which exist at the positions of from (0, 0) to (n, m) on the crack occurrence surface. In this case, a node at the position of (0, 0) corresponds to the crack 55, and thus is vacant. Thus, there is no displacement change of the position of (0, 0). Meanwhile, it is assumed that there is no crack 55 at a node at a position other than the position of (0, 0), and thus a displacement change occurs depending on the boundary condition.

Next, when the crack 55 occurs at a node at the position of (0, 1) on the crack occurrence surface, structure analysis is performed for displacement changes of all the nodes on the crack occurrence surface, which exist at the positions of from (0, 0) to (n, m) on the crack occurrence surface. In this case, a node at the position of (0, 1) corresponds to the crack 55, and thus is vacant. Thus, there is no displacement change of the position of (0, 1). Meanwhile, it is assumed that there is no crack 55 at a node at a position other than the position of (0, 1), and thus a displacement change occurs depending on the boundary condition.

After that, also for nodes at positions other than the positions of (0, 0) and (0, 1) on the crack occurrence surface, structure analysis is similarly performed for displacement changes of all the nodes on the crack occurrence surface. That is, each position of each node on the crack occurrence surface is assumed to have the crack 55, and displacement changes are acquired for positions of all the nodes on the crack occurrence surface. Among the displacement changes acquired in this manner, at least information on the maximum displacement change is stored into the storage 13. The order of positions of nodes set as the crack 55 in the above description are determined in advance.

In other words, the following relationship between the boundary condition and each node on the crack occurrence surface is set. Change amounts in all the directions are set to zero for nodes on the crack occurrence surface to which the constraint condition is set. With this, a node on the crack occurrence surface to which the constraint condition is set does not move. Meanwhile, a change amount in a fixed direction is set to a value other than zero for a node that does not have the crack 55 among nodes on the crack occurrence surface to which the load condition is set. Further, change amounts in all the directions are set to zero for a node that has the crack 55 among nodes on the crack occurrence surface to which the load condition is set.

Figure 6:
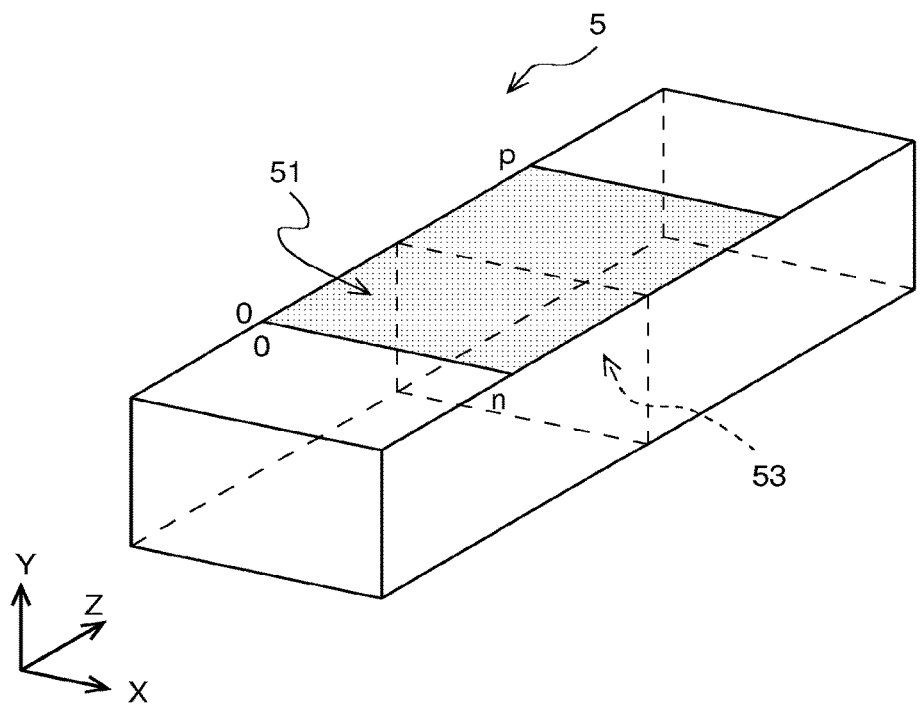
FIG. 6 is a diagram for illustrating an example of reference coordinates set for observation surfaces of FIG. 2 and FIG. 3.
Figure 7:
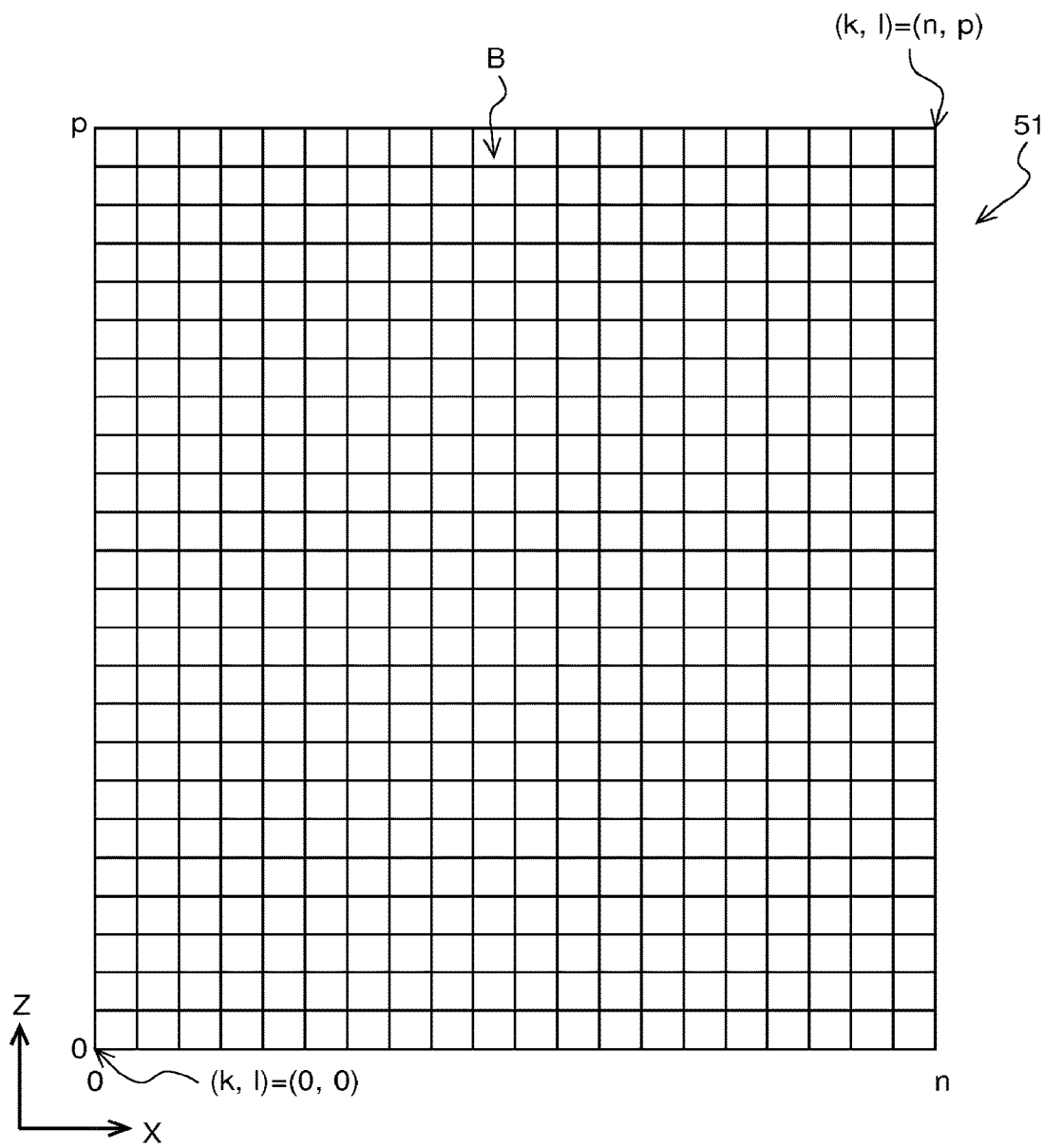
FIG. 7 is a diagram for illustrating an example of each section at a time of division of the observation surface of FIG. 6.

FIG. 6 is a diagram for illustrating an example of reference coordinates set for the observation surface 51 of FIG. 2 and FIG. 3. FIG. 7 is a diagram for illustrating an example of each section B at a time of division of the observation surface 51 of FIG. 6.

As illustrated in FIG. 7, the measurement surface of the structure analysis model is divided into a plurality of sections B. Each section B is acquired by dividing the crack occurrence surface into n sections along an X-axis direction and dividing each of those n sections into p sections along a Z-axis direction.

In other words, the measurement surface in the shape model is divided into n(horizontal)×p(vertical) lattices, and as a result, those lattices intersect with each other and the plurality of sections B are created on the crack occurrence surface of the structure analysis model.

Coordinates of each lattice are represented by (k, l). The origin of (k, l) is (0, 0). A position of the maximum coordinates of (k, l) is (n, p). When each lattice is set as a node, each node is a point on a line forming the section B.

Structure analysis of the measurement surface is performed for each position of each node on the crack occurrence surface.

For example, when the crack 55 occurs at a node at the position of (0, 0) on the crack occurrence surface, structure analysis is performed for strain changes of all the nodes on the measurement surface, which exist at the positions of from (0, 0) to (n, p) on the measurement surface.

Next, when the crack 55 occurs at a node at the position of (0, 1) on the crack occurrence surface, structure analysis is performed for strain changes of all the nodes on the measurement surface, which exist at the positions of from (0, 0) to (n, p) on the measurement surface.

After that, also for nodes at positions other than the positions of (0, 0) and (0, 1) on the crack occurrence surface, structure analysis is similarly performed for strain changes of all the nodes on the measurement surface, which exist at the positions of from (0, 0) to (n, p) on the measurement surface. That is, each position of each node on the crack occurrence surface is assumed to have the crack 55, and strain changes are acquired for positions of all the nodes on the measurement surface. Among the strain changes acquired in this manner, at least information on the maximum strain change is stored into the storage 13.

In other words, the following relationship between the boundary condition and each node on the measurement surface is set. Change amounts in all the directions are set to zero for nodes on the measurement surface to which the constraint condition is set. With this, a node on the measurement surface to which the constraint condition is set does not move. Meanwhile, a change amount in a fixed direction is set to a value other than zero for a node on the measurement surface to which the load condition is set.

Further, principal strain, equivalent strain defined by a Tresca yield criterion, or equivalent strain defined by a Mises yield criterion may be used as the strain in the case of applying the tensile load F1 on the Z-axis or bending moment F2 on the ZX-axis.

In summary of the above description, the model generator is configured to perform structure analysis based on the boundary condition set in advance for the shape model generated based on the measurement surface and the crack occurrence surface. The model generator 11 is configured to perform structure analysis to generate a plurality of measurement surface estimated change vectors each estimating a change of the measurement surface. The model generator 11 is configured to perform structure analysis to generate, as a change of the crack occurrence surface, a plurality of crack occurrence surface estimated change vectors each estimating a displacement change of the crack occurrence surface. The model generator 11 is configured to generate an estimation model including a measurement surface estimated change vector and a crack occurrence surface estimated change vector.

Specifically, the model generator 11 assigns a boundary condition specifying that the crack 55 does not occur to each node of the crack occurrence surface in the structure analysis model. The model generator 11 calculates an amount of displacement change of each node on the crack occurrence surface in the structure analysis model. The model generator 11 calculates strain of each node as deformation of the node on the measurement surface in the structure analysis model.

Further, the model generator 11 assigns a boundary condition specifying that each node of the crack occurrence surface has the crack 55 to each node on the crack occurrence surface in the structure analysis model. Similarly to the above description, the model generator 11 calculates the amount of displacement change of each node on the crack occurrence surface and strain of each node being deformation of the node on the measurement surface.

The model generator 11 creates a displacement change vector indicating a difference being an amount of displacement change of a node on the crack occurrence surface in the structure analysis model.

FIG. 8 is a diagram for illustrating a displacement change vector indicating a difference being an amount of displacement change of each node for each position of the crack 55 on the candidate surface 53 of FIG. 5. As illustrated in FIG. 8, pieces of displacement data on respective nodes included in a column vector of Δ(-, -) are arranged in an order of moving the crack 55 assumed for each of those nodes. In this case, "-" indicates indefinite data without meaning. Also in the following description, "-" similarly indicates indefinite data without meaning.

For example, δ(i, j) represents a displacement change of a node at a position (i, j) on the candidate surface 53 of FIG. 5.

Further, the position of the crack 55 at the time of structure analysis is assigned to this column vector, and the position of the crack 55 at the time of structure analysis is assigned to displacement data on each node included in this column vector.

FIG. 9 is a diagram for illustrating a crack surface matrix $\Delta_{crack\_diff}$ including the plurality of displacement change vectors of FIG. 8. Each of the plurality of displacement change vectors of FIG. 8 includes a column vector. The crack surface matrix $\Delta_{crack\_diff}$ of FIG. 9 is acquired by arranging those column vectors in the order of moving the crack 55 assumed for each node. The crack surface matrix $\Delta_{crack\_diff}$ is represented by Expression (1) given below.

$$\Delta_{crack\_diff} = \begin{pmatrix} \delta_{0,0}(0,) & \cdots & \delta_{i,j}(0, 0) & \cdots & \delta_{n,m}(0, 0) \\ \vdots & \ddots & \vdots & \ddots & \vdots \\ \delta_{0,0}(i, l) & \cdots & \delta_{i,j}(i, j) & \cdots & \delta_{n,m}(i, j) \\ \vdots & \ddots & \vdots & \ddots & \vdots \\ \delta_{0,0}(n, m) & \cdots & \delta_{i,j}(n, m) & \cdots & \delta_{n,m}(n, m) \end{pmatrix} \quad (1)$$

Further, the model generator 11 creates a strain change vector indicating a difference in strain of a node on the measurement surface in the structure analysis model.

FIG. 10 is a diagram for illustrating a strain change vector indicating a difference in strain of each node on the observation surface 51 of FIG. 7 for each position of the crack 55 on the candidate surface 53 of FIG. 5. As illustrated in FIG. 10, pieces of strain data on respective nodes included in a column vector of E(-, -) are arranged in an order of moving the crack 55 assumed for each of those nodes.

For example, ε(i, j) represents a strain change of a node at a position (i, j) on the observation surface 51 of FIG. 7.

Further, the position of the crack 55 at the time of structure analysis is assigned to this column vector, and the position of the crack 55 at the time of structure analysis is assigned to strain data on each node included in this column vector.

FIG. 11 is a diagram for illustrating a measurement surface matrix $E_{measure}$ including the plurality of strain change vectors of FIG. 10. Each of the plurality of strain change vectors of FIG. 10 include a column vector. The measurement surface matrix $E_{measure}$ of FIG. 11 is acquired by arranging those column vectors in the order of moving the crack 55 assumed for each node. The measurement surface matrix $E_{measure}$ is represented by Expression (2) given below.

$$E_{measure} = \begin{pmatrix} \varepsilon_{0,0}(0,) & \cdots & \varepsilon_{i,j}(0, 0) & \cdots & \varepsilon_{n,m}(0, 0) \\ \vdots & \ddots & \vdots & \ddots & \vdots \\ \varepsilon_{0,0}(k, l) & \cdots & \varepsilon_{i,j}(k, l) & \cdots & \varepsilon_{n,m}(k, l) \\ \vdots & \ddots & \vdots & \ddots & \vdots \\ \varepsilon_{0,0}(n, p) & \cdots & \varepsilon_{i,j}(n, p) & \cdots & \varepsilon_{n,m}(n, p) \end{pmatrix} \quad (1)$$

A change in strain of the observation surface 51 on the plate 5 is measured by the measurement device 3 for each of a condition specifying that no crack 55 has occurred inside the plate 5 and a condition specifying that the crack 55 has occurred inside the plate 5. A difference between strain of the observation surface 51 under the condition specifying that no crack 55 has occurred inside the plate 5 and strain of the observation surface 51 under the condition specifying that the crack 55 has occurred inside the plate 5 is acquired. Expression (3) given below represents arrangement of acquired strain differences as column vectors in the same order as that of moving the crack 55 assumed for each node.

$$\tilde{\varepsilon} = \begin{bmatrix} \widetilde{d\varepsilon_{0*0}} \\ \vdots \\ \widetilde{d\varepsilon_{n*p}} \end{bmatrix} \quad (3)$$

The measurement device 3 measures the column vectors represented by Expression (3) as the measurement surface change vector. A suffix of 0*0 in the measurement surface change vector represents a node at the position (0, 0) on the observation surface 51 of FIG. 7. Further, for example, a suffix of n p in the measurement surface change vector represents a node at the position (n, p) on the observation surface 51 of FIG. 7.

The crack state analyzer 12 includes a data acquisition module 121 and a crack state estimator 122.

The data acquisition module 121 is configured to acquire the measurement surface change vector measured by the measurement device 3. The data acquisition module 121 is configured to supply the measurement surface change vector acquired from the measurement device 3 to the crack state estimator 122.

FIG. 12 is a diagram for illustrating each expression to be processed by the crack state estimator 122 of FIG. 1.

The crack state estimator 122 includes a similar vector extractor 1221, a feature extractor 1222, and a crack analyzer 1223.

The similar vector extractor 1221 is configured to set each of the column vectors forming the measurement surface matrix $E_{measure}$ represented by Expression (2) as the measurement surface estimated change vector. The measurement surface estimated change vector is represented by Expression (4) given below.

$$d\varepsilon_{crack_{i,j}} = \begin{bmatrix} \varepsilon_{i,j}(0, 0) \\ \vdots \\ \varepsilon_{i,j}(n, p) \end{bmatrix} \quad (4)$$

The similar vector extractor 1221 sets, as a measurement surface similar change vector, a measurement surface estimated change vector whose similarity with the measurement surface change vector represented by Expression (3) is higher than a reference similarity set in advance. The similar vector extractor 1221 uses a cosine similarity as the similarity, and sets the reference similarity to 0, for example.

The cosine similarity is represented by Expression (5) given below.

$$\frac{d\varepsilon^T_{crack_{i,j}} \cdot \tilde{\varepsilon}}{|d\varepsilon^T_{crack_{i,j}}| \cdot |\tilde{\varepsilon}|} = \gamma \quad (5)$$

The measurement surface similar change vector is represented by Expression (6) given below.

$$E'_{measure} = [\ldots, d\varepsilon_{crack_{i,j}}] \quad (6)$$

The similar vector extractor 1221 sets each of the column vectors forming the crack surface matrix $\Delta_{crack\_diff}$ represented by Expression (1) as the crack occurrence surface estimated change vector. The similar vector extractor 1221 sets a crack occurrence surface estimated change vector corresponding to the measurement surface similar change vector represented by Expression (6) as a crack occurrence surface similar change vector.

The crack occurrence surface similar change vector is represented by Expression (7) given below.

$$\Delta'_{crack\_diff} = [\ldots, d\delta_{crack\_diff_{i,j}}] \quad (7)$$

The similar vector extractor 1221 extracts the measurement surface similar change vector represented by Expression (6) serving as a part of the estimation model and the crack occurrence surface similar change vector represented by Expression (7) serving as another part of the estimation model.

The feature extractor 1222 is configured to solve a L1-norm minimization problem, which is a norm minimization problem, to extract a coefficient vector based on the measurement surface change vector represented by Expression (3) and the measurement surface similar change vector represented by Expression (6).

The coefficient vector is represented by Expression (8) given below.

$$\alpha^* = \text{minimize}_\alpha \|E'_{measure} \cdot \alpha - \tilde{\varepsilon}\|_2^2 + \lambda \|\alpha\|_1 \quad (8)$$

In Expression (8), $\lambda$ represents a Lagrange multiplier. Expression (8) is used to extract a coefficient vector that minimizes a difference between the measurement surface change vector represented by Expression (3) and the measurement surface similar change vector represented by Expression (6).

The crack analyzer 1223 estimates the distribution of displacement changes of the crack occurrence surface based on the coefficient vector represented by Expression (8) and the crack occurrence surface similar change vector represented by Expression (7).

The distribution of displacement changes of the crack occurrence surface is represented by Expression (9) given below.

$$\Delta_{crack_{ans}} = \Delta'_{crack_{diff}} \cdot \alpha^* \quad (9)$$

In Expression (9), the coefficient vector indicating information on the position and size is multiplied by the crack occurrence surface similar change vector indicating information on the position and size. Thus, the result of calculation in Expression (9) indicates the information on the position and size. As a result, the estimated position and size of the crack on the crack occurrence surface are acquired.

Figure 13:
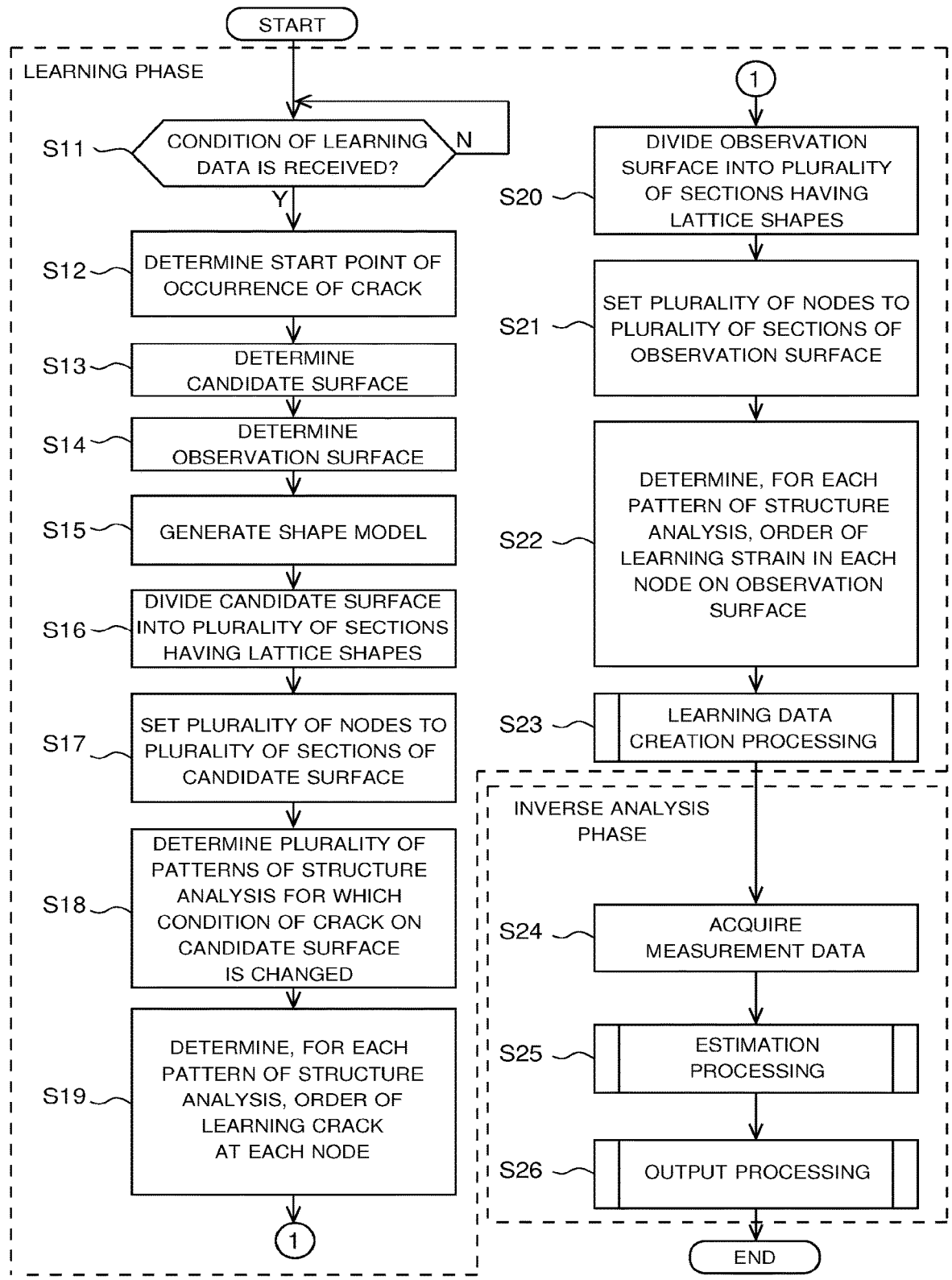
FIG. 13 is a flow chart for illustrating processing to be executed by the estimation device of FIG. 1.

FIG. 13 is a flow chart for illustrating processing to be executed by the estimation device of FIG. 1. The processing of from Step S11 to Step S23 is processing to be executed in a learning phase. The processing of from Step S24 to Step S26 is processing to be executed in an inverse analysis phase.

In Step S11, the estimator 1 determines whether a condition of learning data is received. When it is determined by the estimator 1 that the condition of learning data has not been received, the processing of Step S11 is repeated. The learning data includes a start point of occurrence and shape model of the crack 55 to be estimated, and a shape of the crack 55 to be estimated.

On the contrary, in Step S11, when it is determined by the estimator 1 that the condition of learning data has been received, the processing of Step S11 advances to the processing of Step S12.

In Step S12, the estimator 1 determines the start point of occurrence of the crack 55. Next, the processing of Step S12 advances to the processing of Step S13.

In Step S13, the estimator 1 determines the candidate surface 53. Next, the processing of Step S13 advance to the processing of Step S14.

In Step S14, the estimator 1 determines the observation surface 51. Next, the processing of Step S14 advance to the processing of Step S15.

In Step S15, the estimator 1 generates a shape model. Next, the processing of Step S15 advances to the processing of Step S16.

In Step S16, the estimator 1 divides the candidate surface 53 into a plurality of sections A having lattice shapes. Next, the processing of Step S16 advances to the processing of Step S17.

In Step S17, the estimator 1 sets a plurality of nodes to the plurality of sections A of the candidate surface 53. Next, the processing of Step S17 advances to the processing of Step S18.

In Step S18, the estimator 1 determines a plurality of patterns of structure analysis for which the condition of the crack 55 on the candidate surface 53 is changed. Next, the processing of Step S18 advances to the processing of Step S19.

In Step S19, the estimator 1 determines, for each pattern of structure analysis, the order of learning the crack 55 at each node. Next, the processing of Step S19 advances to the processing of Step S20.

In Step S20, the estimator 1 divides the observation surface 51 into a plurality of sections B having lattice shapes. Next, the processing of Step S20 advances to the processing of Step S21.

In Step S21, the estimator 1 sets a plurality of nodes to the plurality of sections B of the observation surface 51. Next, the processing of Step S21 advances to the processing of Step S22.

In Step S22, the estimator 1 determines, for each pattern of structure analysis, the order of learning strain of each node on the observation surface 51. Next, the processing of Step S22 advances to the processing of Step S23.

Figure 14:
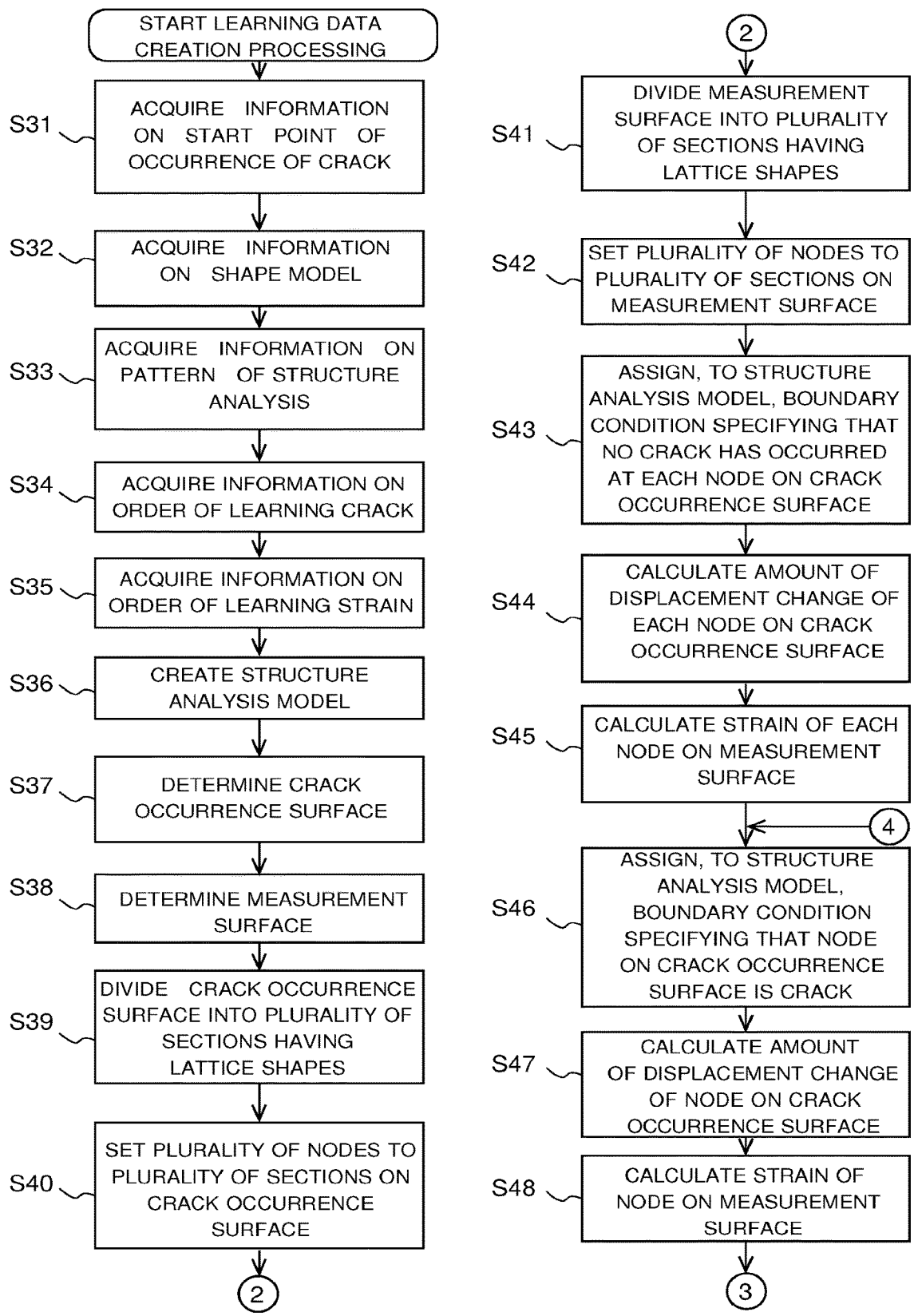
FIG. 14 is a flow chart for illustrating learning data creation processing included in the flow chart of FIG. 13.
Figure 15:
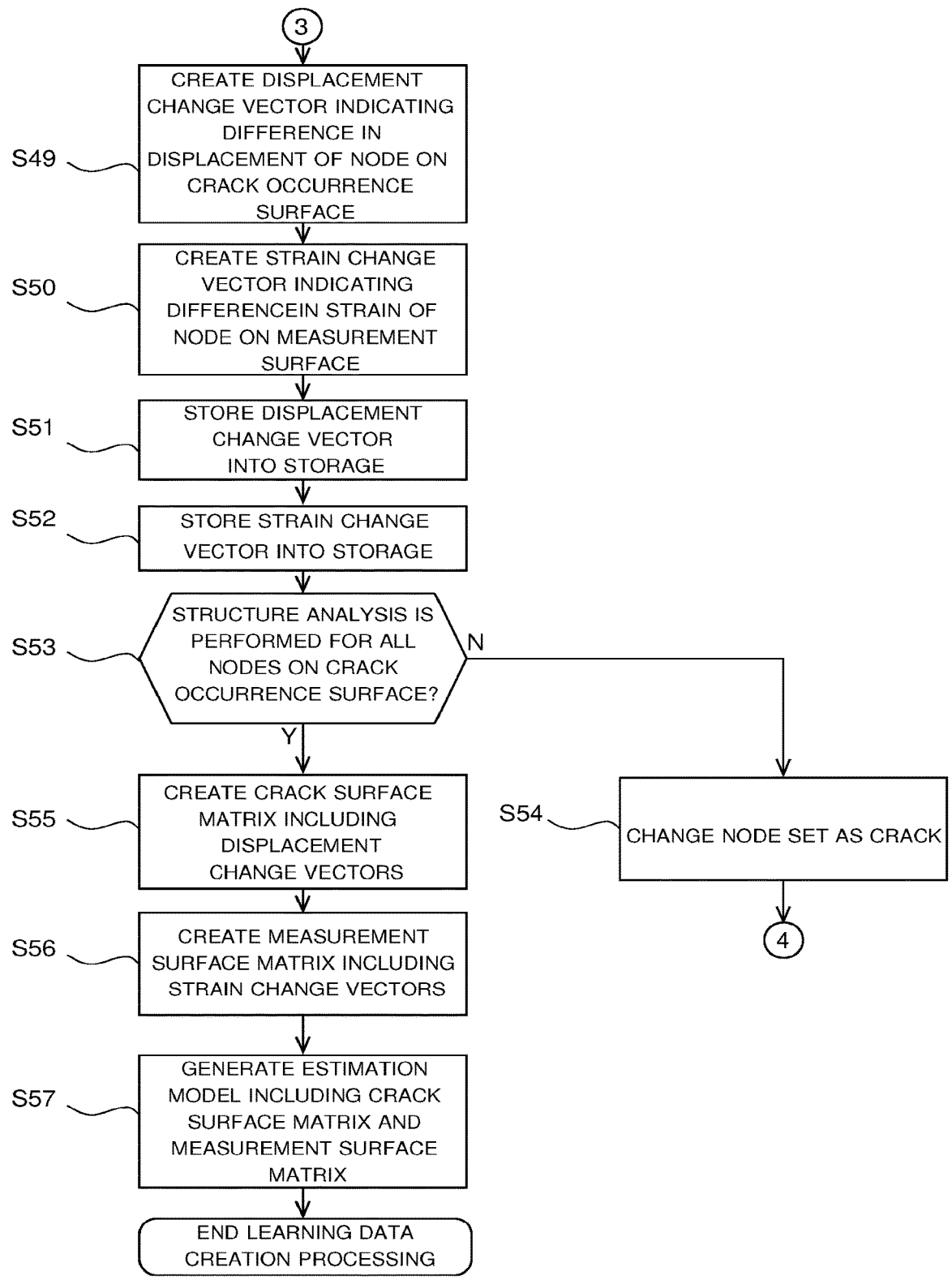
FIG. 15 is a flow chart for illustrating processing subsequent to the flow chart of FIG. 14.

In Step S23, the estimator 1 executes learning data creation processing. Details of the learning data creation processing are illustrated in FIG. 14 and FIG. 15, or in FIG. 19 and FIG. 20. Next, the processing of Step S23 advances to the processing of Step S24.

In Step S24, the estimator 1 acquires measurement data. Next, the processing of Step S24 advances to the processing of Step S25.

Figure 16:
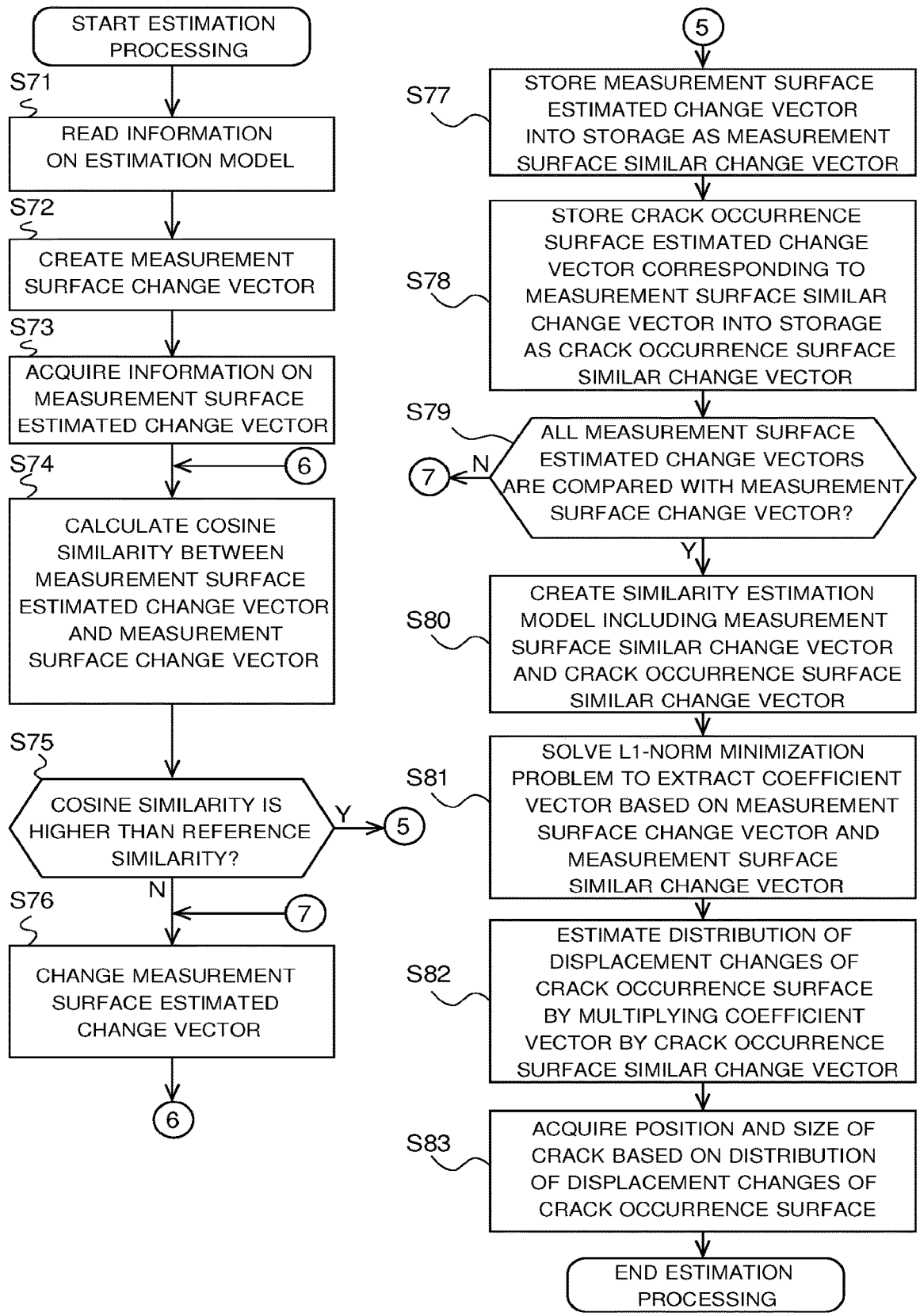
FIG. 16 is a flow chart for illustrating estimation processing included in the flow chart of FIG. 13.

In Step S25, the estimator 1 executes estimation processing. Details of the estimation processing are illustrated in FIG. 16. Next, the processing of Step S25 advances to the processing of Step S26.

In Step S26, the estimator 1 executes output processing. Details of the output processing are described in each of FIG. 34 and FIG. 35. Next, the processing of Step S26 is finished.

FIG. 14 is a flow chart for illustrating learning data creation processing included in the flow chart of FIG. 13.

In Step S31, the estimator 1 acquires information on the start point of occurrence of the crack 55. Next, the processing of Step S31 advances to the processing of Step S32.

In Step S32, the estimator 1 acquires information on the shape model. Next, the processing of Step S32 advances to the processing of Step S33.

In Step S33, the estimator 1 acquires information on the pattern of structure analysis. Next, the processing of Step S33 advances to the processing of Step S34.

In Step S34, the estimator 1 acquires information on the order of learning the crack 55. Next, the processing of Step S34 advances to the processing of Step S35.

In Step S35, the estimator 1 acquires information on the order of learning the strain. Next, the processing of Step S35 advances to the processing of Step S36.

In Step S36, the estimator 1 creates a structure analysis model. Next, the processing of Step S36 advances to the processing of Step S37.

In Step S37, the estimator 1 determines the crack occurrence surface. Next, the processing of Step S37 advance to the processing of Step S38.

In Step S38, the estimator 1 determines the measurement surface. Next, the processing of Step S38 advance to the processing of Step S39.

In Step S39, the estimator 1 divides the crack occurrence surface into a plurality of sections A having lattice shapes. Next, the processing of Step S39 advances to the processing of Step S40.

In Step S40, the estimator 1 sets a plurality of nodes to the plurality of sections A of the crack occurrence surface. Next, the processing of Step S40 advances to the processing of Step S41.

In Step S41, the estimator 1 divides the measurement surface into a plurality of sections B having lattice shapes. Next, the processing of Step S41 advances to the processing of Step S42.

In Step S42, the estimator 1 sets a plurality of nodes to the plurality of sections B of the measurement surface. Next, the processing of Step S42 advances to the processing of Step S43.

In Step S43, the estimator 1 assigns, to the structure analysis model, a boundary condition specifying that no crack 55 has occurred at each node on the crack occurrence surface. Next, the processing of Step S43 advances to the processing of Step S44.

In Step S44, the estimator 1 calculates the amount of displacement change of each node on the crack occurrence surface. Next, the processing of Step S44 advances to the processing of Step S45.

In Step S45, the estimator 1 calculates strain of each node on the measurement surface. Next, the processing of Step S45 advances to the processing of Step S46.

In Step S46, the estimator 1 assigns, to the structure analysis model, a boundary condition specifying that the node on the crack occurrence surface is the crack 55. Next, the processing of Step S46 advances to the processing of Step S47.

In Step S47, the estimator 1 calculates the amount of displacement change of each node on the crack occurrence surface. Next, the processing of Step S47 advances to the processing of Step S48.

In Step S48, the estimator 1 calculates strain of the node on the measurement surface. Next, the processing of Step S48 advances to the processing of Step S49 illustrated in FIG. 15.

FIG. 15 is a flow chart for illustrating processing subsequent to the flow chart of FIG. 14.

In Step S49, the estimator 1 creates a displacement change vector indicating a difference being an amount of displacement change of a node on the crack occurrence surface. Next, the processing of Step S49 advances to the processing of Step S50.

In Step S50, the estimator 1 creates a strain change vector indicating a difference being the strain of a node on the measurement surface. Next, the processing of Step S50 advances to the processing of Step S51.

In Step S51, the estimator 1 stores the displacement change vector into the storage 13. Next, the processing of Step S51 advances to the processing of Step S52.

In Step S52, the estimator 1 stores the strain change vector into the storage 13. Next, the processing of Step S52 advances to the processing of Step S53.

In Step S53, the estimator 1 determines whether structure analysis is performed for all the nodes on the crack occurrence surface. When the estimator 1 has determined that structure analysis is not performed for all the nodes on the crack occurrence surface, the processing of Step S53 advances to the processing of Step S54.

In Step S54, the estimator 1 changes the node set as the crack 55. Next, the processing of Step S54 returns to the processing of Step S46 illustrated in FIG. 14.

On the contrary, when the estimator 1 has determined that structure analysis is performed for all the nodes on the crack occurrence surface, the processing of Step S53 advances to the processing of Step S55.

In Step S55, the estimator 1 creates a crack surface matrix $\Delta_{crack\_diff}$ including a displacement change vector. Next, the processing of Step S55 advances to the processing of Step S56.

In Step S56, the estimator 1 creates a measurement surface matrix $E_{measure}$ including a strain change vector. Next, the processing of Step S56 advances to the processing of Step S57.

In Step S57, the estimator 1 generates an estimation model including the crack surface matrix $\Delta_{crack\_diff}$ and the measurement surface matrix $E_{measure}$. Next, the processing of Step S57 finishes the learning data creation processing.

FIG. 16 is a flow chart for illustrating estimation processing included in the flow chart of FIG. 13.

In Step S71, the estimator 1 reads estimation model information. Next, the processing of Step S71 advances to the processing of Step S72.

In Step S72, the estimator 1 creates a measurement surface change vector based on measurement data acquired in Step S24 before starting execution of the estimation processing. Next, the processing of Step S72 advances to the processing of Step S73.

In Step S73, the estimator 1 acquires information on the measurement surface estimated change vector. Next, the processing of Step S73 advances to the processing of Step S74.

In Step S74, the estimator 1 calculates a cosine similarity between the measurement surface estimated change vector and the measurement surface change vector. Next, the processing of Step S74 advances to the processing of Step S75.

In Step S75, the estimator 1 determines whether the cosine similarity is higher than a reference similarity. When the estimator 1 has determined that the cosine similarity is not higher than the reference similarity, the processing of Step S75 advances to the processing of Step S76. When the estimator 1 has determined that the cosine similarity is not higher than the reference similarity, this means that the estimator 1 has determined that the cosine similarity is equal to or smaller than the reference similarity.

In Step S76, the estimator 1 changes the measurement surface estimated change vector. Next, the processing of Step S76 returns to the processing of Step S74.

On the contrary, in Step S75, when the estimator 1 has determined that the cosine similarity is higher than the reference similarity, the processing of Step S75 advances to the processing of Step S77.

In Step S77, the estimator 1 stores the measurement surface estimated change vector into the storage 13 as the measurement surface similar change vector. Next, the processing of Step S77 advances to the processing of Step S78.

In Step S78, the estimator 1 stores a crack occurrence surface estimated change vector corresponding to the measurement surface similar change vector into the storage 13 as the crack occurrence surface similar change vector. Next, the processing of Step S78 advances to the processing of Step S79.

In Step S79, the estimator 1 determines whether all the measurement surface estimated change vectors are compared with the measurement surface change vector. When the estimator 1 has determined that all the measurement surface estimated change vectors are not compared with the measurement surface change vector, the processing of Step S79 returns to the processing of Step S76.

On the contrary, in Step S79, when the estimator 1 has determined that all the measurement surface estimated change vectors are compared with the measurement surface change vector, the processing of Step S79 advances to the processing of Step S80.

In Step S80, the estimator 1 creates a similarity estimation model including the measurement surface similar change vector and the crack occurrence surface similar change vector. Next, the processing of Step S80 advances to the processing of Step S81.

In Step S81, the estimator 1 solves a L1-norm minimization problem to extract a coefficient vector based on the measurement surface change vector and the measurement surface similar change vector. The processing of Step S81 advances to the processing of Step S82.

In Step S82, the estimator 1 estimates the distribution of displacement changes of the crack occurrence surface by multiplying the coefficient vector by the crack occurrence surface similar change vector. Next, the processing of Step S82 advances to the processing of Step S83.

In Step S83, the estimator 1 acquires the position and size of the crack 55 based on the distribution of displacement changes of the crack occurrence surface. Next, the processing of Step S83 finishes the estimation processing.

Figure 17:
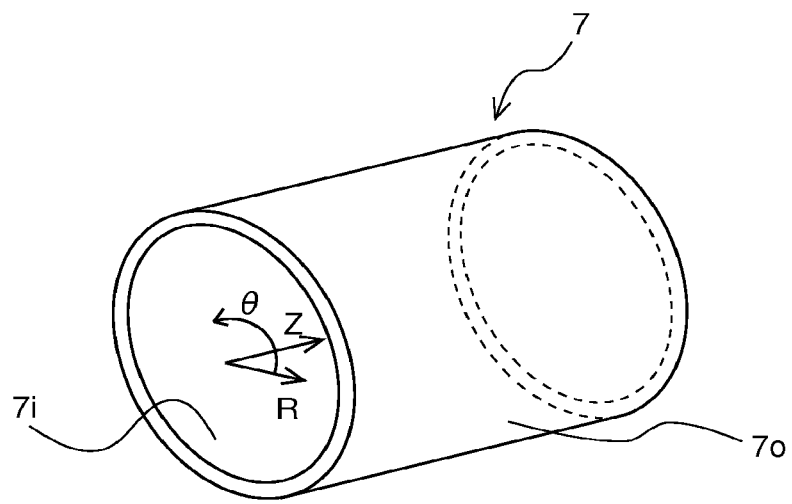
FIG. 17 is a schematic view of a coordinate system at a time when an internal pressure is applied to an inside of a column member serving as the structure to be subjected to estimation by the estimation device of FIG. 1.

FIG. 17 is a schematic view of a coordinate system at a time when an internal pressure Pi is applied to an inside of a column member 7 serving as the structure to be subjected to estimation by the estimation device of FIG. 1. In FIG. 17, the column member 7 is represented in a cylindrical coordinate system.

Figure 18:
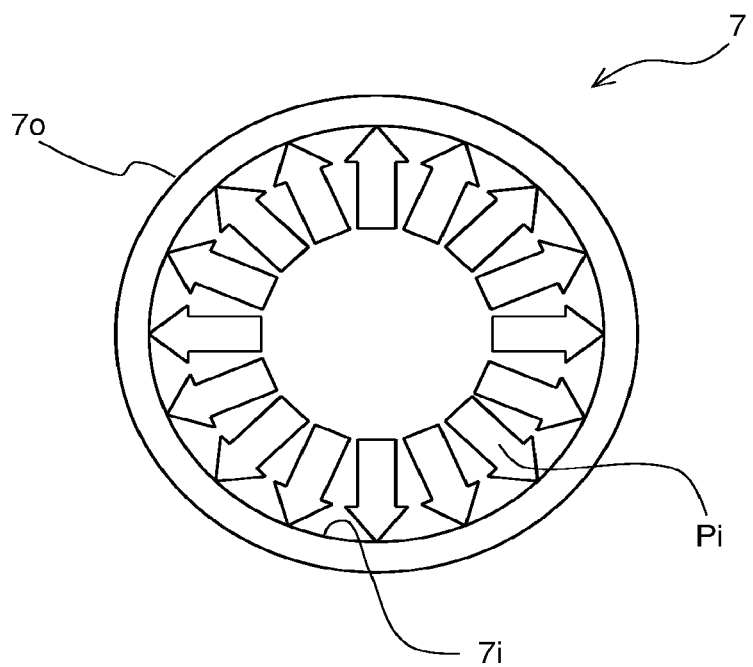
FIG. 18 is a plan view of the column member of FIG. 17.

FIG. 18 is a plan view of the column member 7 of FIG. 17. As illustrated in FIG. 18, the inner pressure Pi is applied to the inner peripheral surface 7*i* of the column member 7 at the time of shrink-fitting. As a result, the shape of an outer peripheral surface 7*o* of the column member 7 changes due to occurrence of the crack 55 inside the column member 7. Through shrink-fitting, the column member 7 is mounted to a holding ring of a rotator core that protrudes at an end of a rotator of the rotary electric machine, for example.

According to the above description, in the first embodiment, the estimation device includes the measurement device 3 and the estimator 1. The measurement device 3 is configured to set the observation surface 51 on the surface of a structure as the measurement surface to measure the change of the measurement surface as the measurement surface change vector. The estimator 1 is configured to solve the norm minimization problem to acquire a coefficient vector by setting, as parameters, the measurement surface change vector and a part of the estimation model generated based on a shape model that models the shape of the structure. The coefficient vector forms the sparse solution. The estimator 1 is configured to use the coefficient vector and another part of the estimation model to estimate the change of the crack occurrence surface by setting, as the crack occurrence surface, the candidate surface 53, which is inside the structure and assumed to have the crack 55.

With the configuration described above, when the distribution of displacement changes of the crack occurrence surface is estimated, the feature of the measurement surface change vector is extracted as a coefficient vector. This coefficient vector forms a sparse solution. As a result, this coefficient vector is a small number of non-zero elements. Thus, uniqueness of the solution, existence of the solution, and stability of the solution are satisfied, and it is possible to accurately estimate the crack 55 inside the structure.

Further, the estimator 1 includes the model generator 11, the similar vector extractor 1221, the feature extractor 1222, and the crack analyzer 1223.

The model generator 11 is configured to perform structure analysis based on the boundary condition set in advance for the shape model generated based on the measurement surface and the crack occurrence surface. The model generator 11 is configured to perform structure analysis to generate a plurality of measurement surface estimated change vectors each estimating a change of the measurement surface. The model generator 11 is configured to perform structure analysis to generate, as a change of the crack occurrence surface, a plurality of crack occurrence surface estimated change vectors each estimating a displacement change of the crack occurrence surface. The model generator 11 is configured to generate an estimation model including a measurement surface estimated change vector and a crack occurrence surface estimated change vector.

The similar vector extractor 1221 is configured to set, as the measurement surface similar change vector, a measurement surface estimated change vector whose similarity with the measurement surface change vector is higher than the reference similarity set in advance. The similar vector extractor 1221 is configured to set, as the crack occurrence surface similar change vector, a crack occurrence surface estimated change vector corresponding to the measurement surface similar change vector. The similar vector extractor 1221 is configured to extract the measurement surface similar change vector serving as a part of the estimation model and a crack occurrence surface similar change vector serving as another part of the estimation model.

The feature extractor 1222 is configured to solve a L1-norm minimization problem, which is a norm minimization problem, to extract a coefficient vector based on the measurement surface change vector and the measurement surface similar change vector.

The crack analyzer 1223 is configured to estimate the change of distribution of displacement changes of the crack occurrence surface based on the coefficient vector and the crack occurrence surface similar change vector.

With the configuration described above, a measurement surface estimated change vector having a high similarity is used as the measurement surface similar change vector among measurement surface estimated change vectors, and thus it is possible to execute estimation processing by screening learning data. Thus, the result of estimating the distribution of displacement changes of the crack occurrence surface becomes accurate.

Further, the similar vector extractor 1221 is configured to use a cosine similarity as the similarity.

Thus, it is possible to shorten the period of time for calculating the similarity.

Further, the model generator 11 is configured to divide the crack occurrence surface into the plurality of sections A, and set a plurality of nodes forming the respective sections A as the crack 55, and estimate the displacement change of each node as each crack occurrence surface estimated change vector.

With the configuration described above, learning data is limited, and thus it is possible to shorten the period of time for generating an estimation model.

Further, the model generator 11 is configured to model the shape model as a model in a cylindrical coordinate system.

With the configuration described above, even when the structure has a column shape, it is possible to accurately estimate the crack 55 inside the structure.

Second Embodiment

In a second embodiment of this disclosure, description of configurations and functions that are the same as or equivalent to those of the first embodiment is omitted. A node to be identified as the crack 55 in the second embodiment is different from a node identified as the crack 55 in the first embodiment. Other configurations of the second embodiment are similar to those of the first embodiment. In other words, other configurations of the second embodiment are configurations and functions that are the same as or equivalent to those of the first embodiment. Thus, other configurations of the second embodiment are denoted by the same reference symbols as those of the first embodiment.

Figure 19:
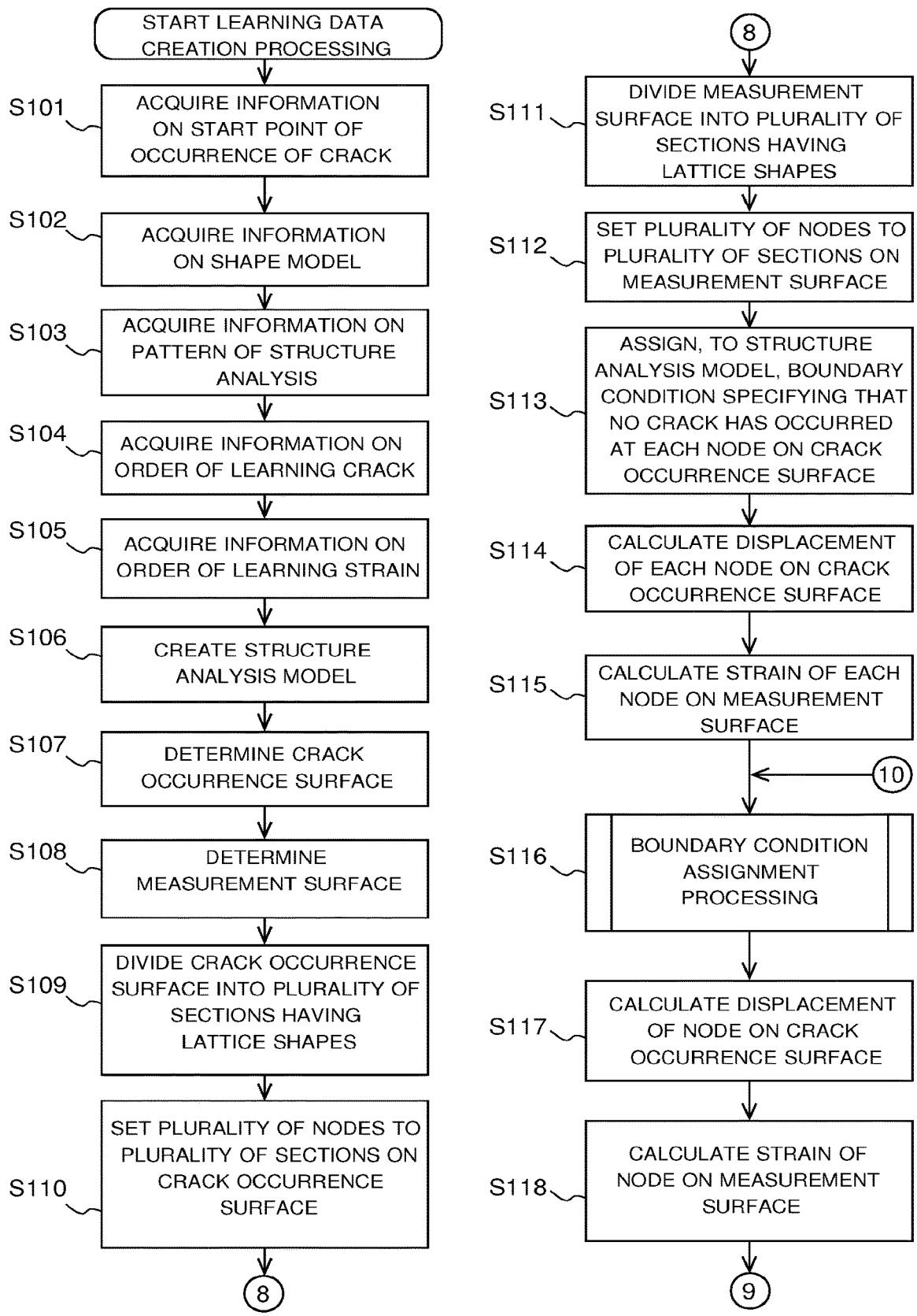
FIG. 19 is a flow chart for illustrating learning data creation processing in a second embodiment of this disclosure.
Figure 25:
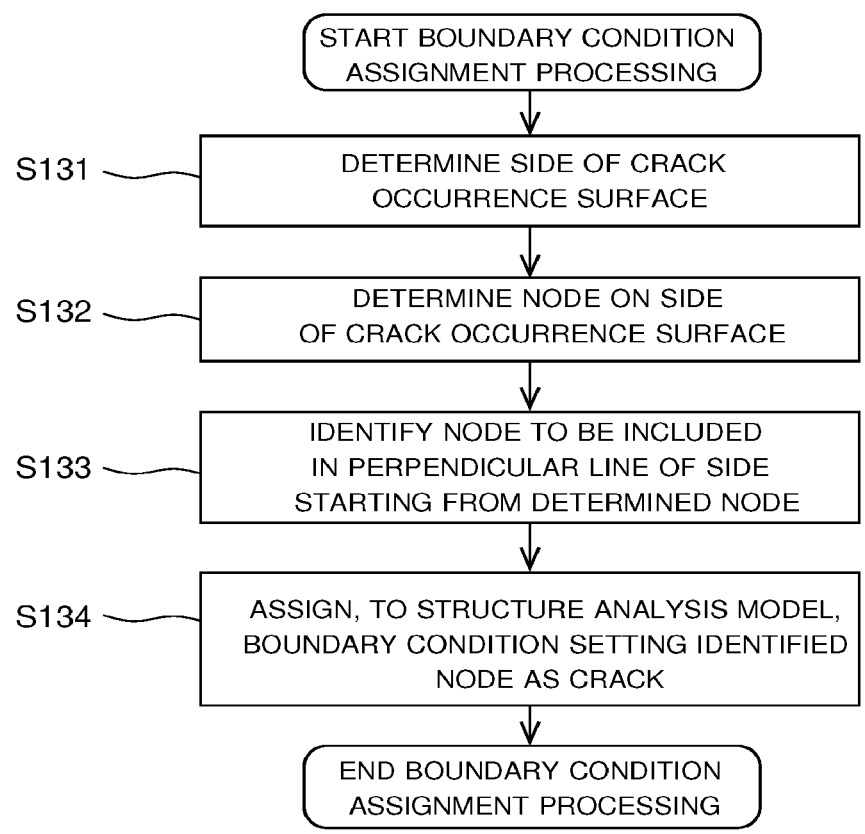
FIG. 25 is a flow chart for illustrating the boundary condition assignment processing of FIG. 19.

FIG. 19 is a flow chart for illustrating learning data creation processing in the second embodiment. The processing of from Step S101 to Step S115, and the processing of Step S117 and Step S118 are similar to the processing of from Step S31 to Step S45, and the processing of Step S47 and Step S48, respectively. Thus, description thereof is omitted here. The processing of Step S116 is processing different from that of the first embodiment. In Step S116, the estimator 1 executes boundary condition assignment processing. Details of the boundary condition assignment processing are illustrated in FIG. 25.

Figure 20:
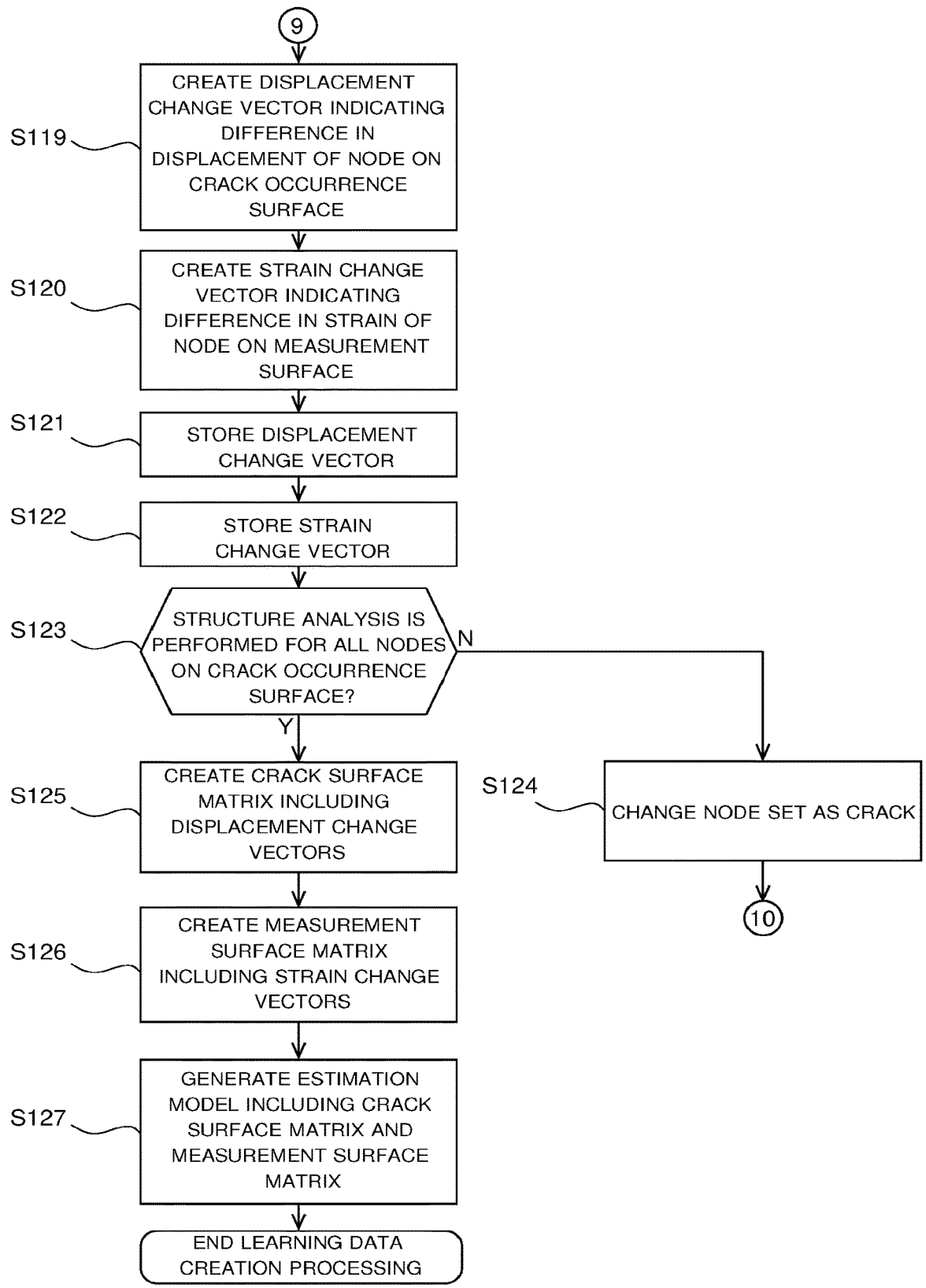
FIG. 20 is a flow chart for illustrating processing subsequent to the flow chart of FIG. 19.

FIG. 20 is a flow chart for illustrating processing subsequent to the flow chart of FIG. 19. The processing of from Step S119 to Step S127 is similar to the processing of from Step S49 to Step S57 of FIG. 15 except for processing that is executed subsequent to the processing of Step S124. Thus, description thereof is omitted here. After the estimator 1 has executed the processing of Step S124, the processing of Step S124 returns to the processing of Step S116.

Figure 21:
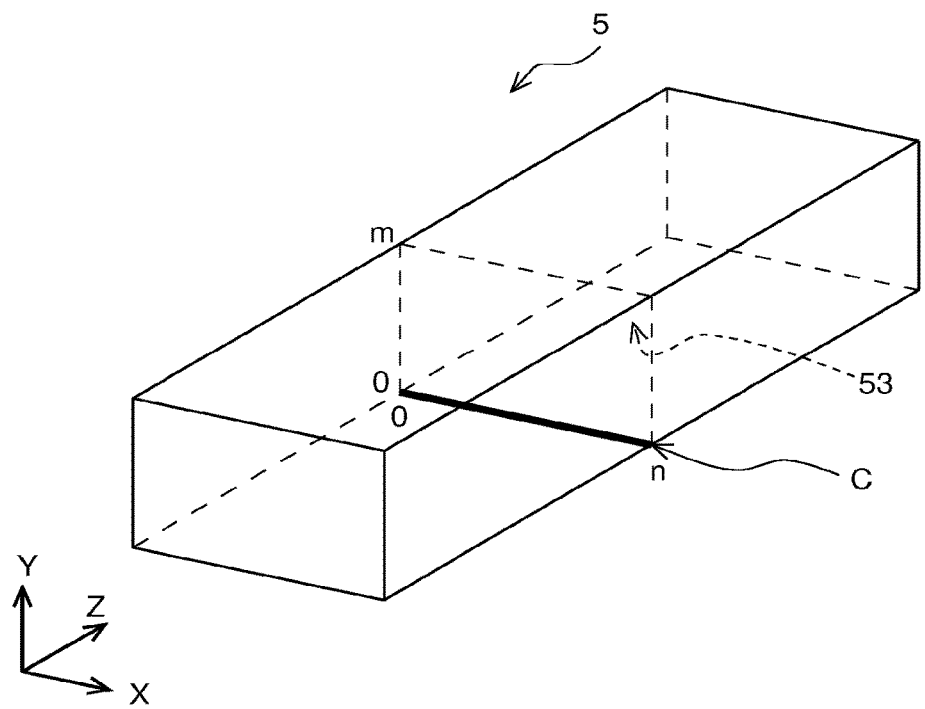
FIG. 21 is a diagram for illustrating an example of a side of a crack occurrence surface determined at a time of boundary condition assignment processing of FIG. 19.

FIG. 21 is a diagram for illustrating an example of a side C of a crack occurrence surface determined at a time of the boundary condition assignment processing of FIG. 19.

Figure 22:
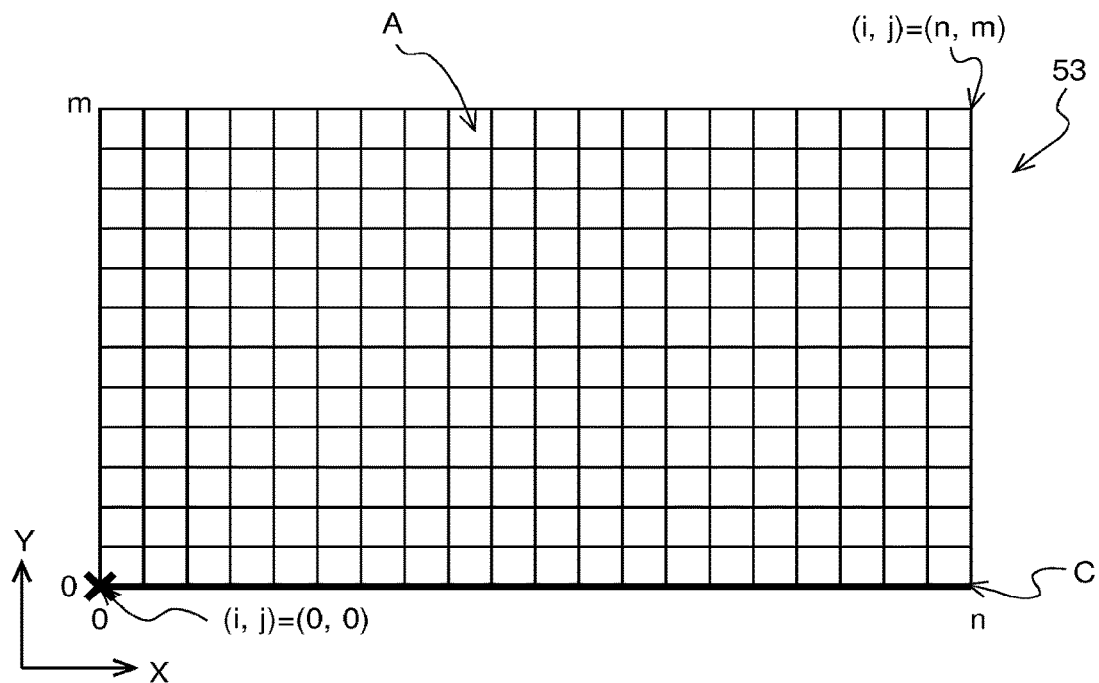
FIG. 22 is a diagram for illustrating a first example of a node identified as a crack on a crack occurrence surface determined at the time of the boundary condition assignment processing of FIG. 19.

FIG. 22 is a diagram for illustrating a first example of a node identified as the crack 55 on the crack occurrence surface determined at the time of the boundary condition assignment processing of FIG. 19. In FIG. 22, a node at the position (0, 0) on the side C is identified as the crack 55. As a result, the crack 55 is set at the position of (0, 0). The measurement surface estimated change vector is calculated by performing structure analysis under such a boundary condition.

Figure 23:
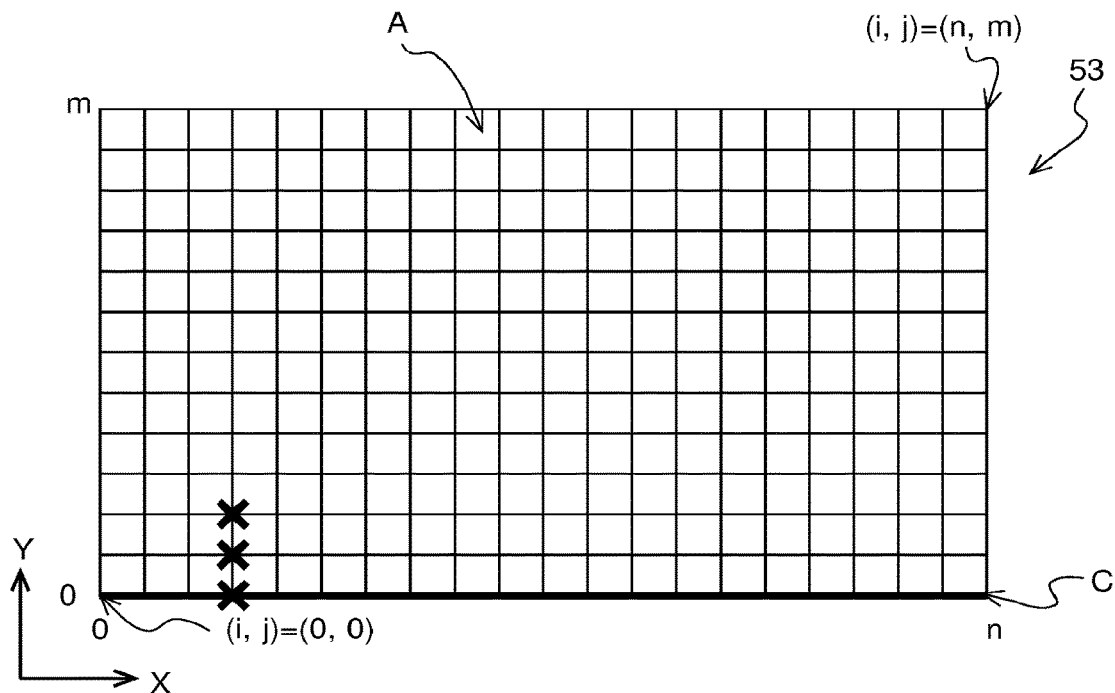
FIG. 23 is a diagram for illustrating a second example of the node identified as a crack on the crack occurrence surface determined at the time of the boundary condition assignment processing of FIG. 19.

FIG. 23 is a diagram for illustrating a second example of the node identified as the crack 55 on the crack occurrence surface determined at the time of the boundary condition assignment processing of FIG. 19. In FIG. 23, a node at the position of (3, 2) is identified as the crack 55. In this case, the crack 55 is at a position other than the side C. Thus, all the nodes included in a perpendicular line that extends from the node to the line C are determined as the crack 55. AS a result, the crack 55 is set at the positions of (3, 2), (3, 1), and (3, 0). The measurement surface estimated change vector is calculated by performing structure analysis under such a boundary condition.

Figure 24:
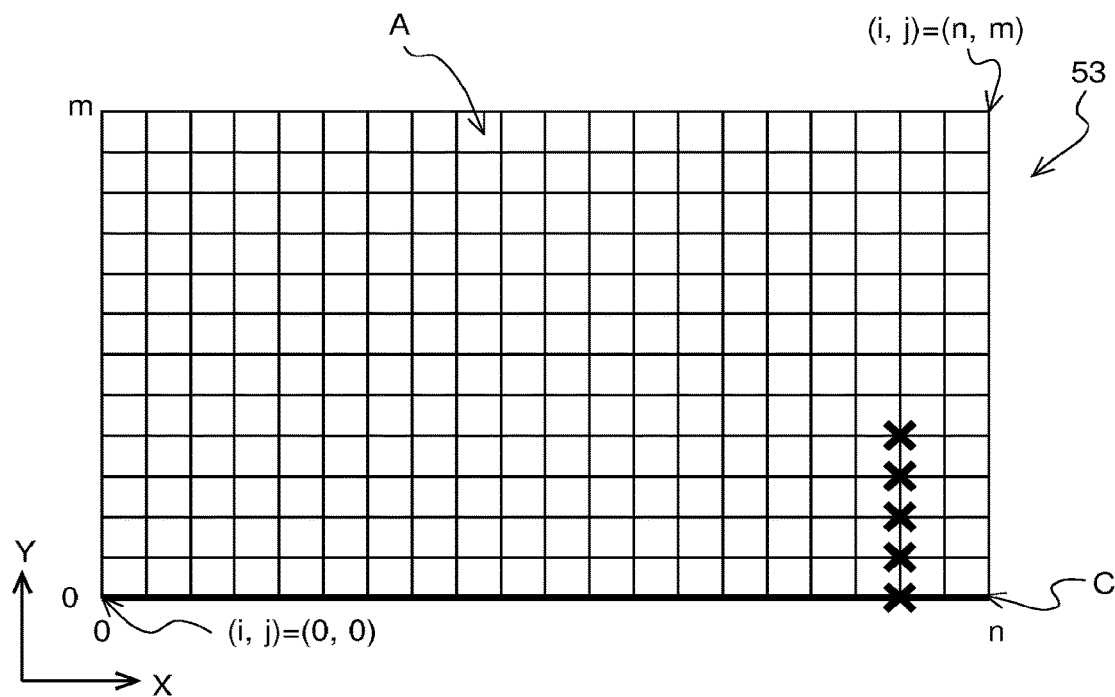
FIG. 24 is a diagram for illustrating a third example of the node identified as a crack on the crack occurrence surface determined at the time of the boundary condition assignment processing of FIG. 19.

FIG. 24 is a diagram for illustrating a third example of the node identified as the crack 55 on the crack occurrence surface determined at the time of the boundary condition assignment processing of FIG. 19. In FIG. 24, a node at the position of (n−2, 4) is identified as the crack 55. In this case, the crack 55 is at a position other than the side C. Thus, all the nodes included in a perpendicular line that extends from the node to the line C are determined as the crack 55. AS a result, the crack 55 is set at the positions of (n−2, 4), (n−2, 3), (n−2, 2), (n−2, 1), and (n−2, 0). The measurement surface estimated change vector is calculated by performing structure analysis under such a boundary condition.

FIG. 25 is a flow chart for illustrating the boundary condition assignment processing of FIG. 19.

In Step S131, the estimator 1 determines the side C of the crack occurrence surface. Next, the processing of Step S131 advances to the processing of Step S132.

In Step S132, the estimator 1 determines a node on the side C of the crack occurrence surface. Next, the processing of Step S132 advances to the processing of Step S133.

In Step S133, the estimator 1 identifies a node to be included in a perpendicular line of the side C, which starts from the determined node. Next, the processing of Step S133 advances to the processing of Step S134.

In Step S134, the estimator 1 assigns, to the structure analysis model, a boundary condition setting the identified node as the crack 55. Next, the processing of Step S134 finishes the boundary condition assignment processing.

According to the above description, in the second embodiment, the model generator 11 is configured to focus on displacement changes of a plurality of nodes forming the plurality of sections A, which are continuously adjacent to one another in a part of the region on the crack occurrence surface, among the sections A.

With the configuration described above, it is possible to limit learning data by narrowing down nodes identified as the crack 55. Therefore, it is possible to suppress reduction of the accuracy of estimating the change of the crack occurrence surface due to overtraining.

Third Embodiment

In a third embodiment of this disclosure, description of configurations and functions that are the same as or equivalent to those of the first and second embodiments is omitted. The measurement surface matrix $Dis_{measure}$ and the measurement surface matrix $A_{measure}$ in the third embodiment are different from the measurement surface matrix $E_{measure}$ in the first and second embodiments. Other configurations of the third embodiment are similar to those of the first and second embodiments. That is, other configurations of the third embodiment are configurations and functions that are the same as or equivalent to those of the first and second embodiments. Thus, other configurations of the third embodiment are denoted by the same reference symbols as those of the first and second embodiments.

FIG. 26 is a diagram for illustrating a displacement change vector indicating a displacement change of each node on the observation surface 51 for each position of the crack 55 on the candidate surface 53 in the third embodiment. As illustrated in FIG. 26, pieces of displacement data on respective nodes included in a column vector of Dis(-, -) are arranged in an order of moving the crack 55 assumed for each of those nodes. A position d(i, j) represents a displacement change of a node at a position (i, j) on the observation surface 51 of FIG. 7. Further, the position of the crack 55 at the time of structure analysis is assigned to this column vector, and the position of the crack 55 at the time of structure analysis is assigned to displacement data on each node included in this column vector.

FIG. 27 is a diagram for illustrating a measurement surface matrix $Dis_{measure}$ including the plurality of displacement change vectors of FIG. 26. Each of the plurality of displacement change vectors of FIG. 26 includes a column vector. The measurement surface matrix $Dis_{measure}$ of FIG. 27 is acquired by arranging those column vectors in the order of moving the crack 55 assumed for each node. The measurement surface matrix $Dis_{measure}$ is represented by Expression (10) given below.

$$Dis_{measure} = \begin{pmatrix} d_{0,0}(0,) & \ldots & d_{i,j}(0,0) & \ldots & d_{n,m}(0,0) \\ \vdots & \ddots & \vdots & \ddots & \vdots \\ d_{0,0}(k,l) & \ldots & d_{i,j}(k,l) & \ldots & d_{n,m}(k,l) \\ \vdots & \ddots & \vdots & \ddots & \vdots \\ d_{0,0}(n,p) & \ldots & d_{i,j}(n,p) & \ldots & d_{n,m}(n,p) \end{pmatrix} \quad (10)$$

Further, when the displacement change of each node on the observation surface 51 is measured, the measurement device 3 includes at least a displacement sensor. The displacement sensor includes, for example, a laser displacement sensor, an eddy current loss type displacement sensor, a capacitance type displacement sensor, a contact type displacement sensor, a wire type displacement sensor, or a laser micrometer.

Further, the displacement measurement method may include optical measurement such as speckle interferometry, moire interferometry, or a digital image correlation method.

FIG. 28 is a diagram for illustrating an angle change vector indicating an angle of each node on the observation surface 51 for each position of the crack 55 on the candidate surface 53 in the third embodiment. As illustrated in FIG. 28, pieces of angle data on respective nodes included in a column vector of A(-, -) are arranged in an order of moving the crack assumed for each of those nodes. A position A(i, j) represents an angle change of a node at a position (i, j) on the observation surface 51 of FIG. 7. Further, the position of the crack 55 at the time of structure analysis is assigned to this column vector, and the position of the crack 55 at the time of structure analysis is assigned to angle data on each node included in this column vector.

FIG. 29 is a diagram for illustrating a measurement surface matrix $A_{measure}$ including the plurality of angle change vectors of FIG. 28. Each of the plurality of angle change vectors of FIG. include a column vector. The measurement surface matrix $A_{measure}$ of FIG. 29 is acquired by arranging those column vectors in the order of moving the crack 55 assumed for each node. The measurement surface matrix $A_{measure}$ is represented by Expression (11) given below.

$$A_{measure} = \begin{pmatrix} a_{0,0}(0,) & \ldots & a_{i,j}(0,0) & \ldots & a_{n,m}(0,0) \\ \vdots & \ddots & \vdots & \ddots & \vdots \\ a_{0,0}(k,l) & \ldots & a_{i,j}(k,l) & \ldots & a_{n,m}(k,l) \\ \vdots & \ddots & \vdots & \ddots & \vdots \\ a_{0,0}(n,p) & \ldots & a_{i,j}(n,p) & \ldots & a_{n,m}(n,p) \end{pmatrix} \quad (11)$$

Further, when the angle of each node on the observation surface 51 is measured, the measurement device 3 includes at least an inclination sensor. That is, the inclination angle of each node on the observation surface 51 is measured by the inclination sensor. Further, the principle of an optical lever may be used to measure the angle of a node on the observation surface 51.

According to the above description, in the third embodiment, the measurement device 3 is configured to measure, as the change of the measurement surface, at least one of the displacement change, the strain change, or the angle change of the measurement surface.

With the configuration described above, at least one of the strain change, the displacement change, or the angle change can be used as the change of the measurement surface in a structure, and thus it is possible to increase the type of measurement methods.

Further, it is possible to measure the change of the observation surface 51 in a structure in a shorter period of time and more accurately than measurement of strain by using not a strain change but a displacement change or an angle change as the change of the observation surface 51 in the structure.

Fourth Embodiment

In a fourth embodiment of this disclosure, description of configurations and functions that are the same as or equivalent to those of the first to third embodiments is omitted. The crack surface matrix $Z_{crack\_diff}$ in the fourth embodiment are different from the crack surface matrix $\Delta_{crack\_diff}$ in the first to third embodiments. Other configurations of the fourth embodiment are similar to those of the first to third embodiments. That is, other configurations of the fourth embodiment are configurations and functions that are the same as or equivalent to those of the first to third embodiments. Thus, other configurations of the fourth embodiment are denoted by the same reference symbols as those of the first to third embodiments.

FIG. 30 is a diagram for illustrating a load change vector indicating a load of each node for each position of the crack 55 on the candidate surface 53 in the fourth embodiment. As illustrated in FIG. 30, pieces of load data on respective nodes included in a column vector of Z(-, -) are arranged in an order of moving the crack 55 assumed for each of those nodes. A position ξ(i, j) represents a load of a node at a position (i, j) on the candidate surface 53 of FIG. 5. Further, the position of the crack 55 at the time of structure analysis is assigned to this column vector, and the position of the crack 55 at the time of structure analysis is assigned to load data on each node included in this column vector.

FIG. 31 is a diagram for illustrating a crack surface matrix $Z_{crack\_diff}$ including the plurality of load change vectors of FIG. 30. Each of the plurality of load change vectors of FIG. 30 includes a column vector. The crack surface matrix $Z_{crack\_diff}$ of FIG. 31 is acquired by arranging those column vectors in the order of moving the crack 55 assumed for each node. The crack surface matrix $Z_{crack\_diff}$ is represented by Expression (12) given below.

$$Z_{crack\_diff} = \begin{pmatrix} \zeta_{0,0}(0,) & \dots & \zeta_{i,j}(0,0) & \dots & \zeta_{n,m}(0,0) \\ \vdots & \ddots & \vdots & \ddots & \vdots \\ \zeta_{0,0}(i,l) & \dots & \zeta_{i,j}(i,j) & \dots & \zeta_{n,m}(i,j) \\ \vdots & \ddots & \vdots & \ddots & \vdots \\ \zeta_{0,0}(n,m) & \dots & \zeta_{i,j}(n,m) & \dots & \zeta_{n,m}(n,m) \end{pmatrix} \quad (12)$$

Specifically, the force of a node at a position of the crack 55 is set to 0, and the force of a node at a position without the crack 55 is set to a value other than 0. Specifically, a force is generated at a node other than the position of the crack 55, and thus it is possible to accurately estimate the crack 55 inside a structure also by using node load data.

According to the above description, in the fourth embodiment, the model generator 11 is configured to estimate a change in load of the crack occurrence surface as the change of the crack occurrence surface.

With the configuration described above, the crack surface matrix $Z_{crack\_diff}$ can include load change information, and thus it is possible to estimate the crack 55 accurately in terms of various aspects.

Fifth Embodiment

In a fifth embodiment of this disclosure, description of configurations and functions that are the same as or equivalent to those of the first to fourth embodiments is omitted. In the fifth embodiment, the configuration of applying a load to a structure for inspection is different from those of the first to fourth embodiments. Other configurations of the fifth embodiment are similar to those of the first to fourth embodiments. That is, other configurations of the fifth embodiment are configurations and functions that are the same as or equivalent to those of the first to fourth embodiments. Thus, other configurations of the fifth embodiment are denoted by the same reference symbols as those of the first to fourth embodiments.

Figure 32:
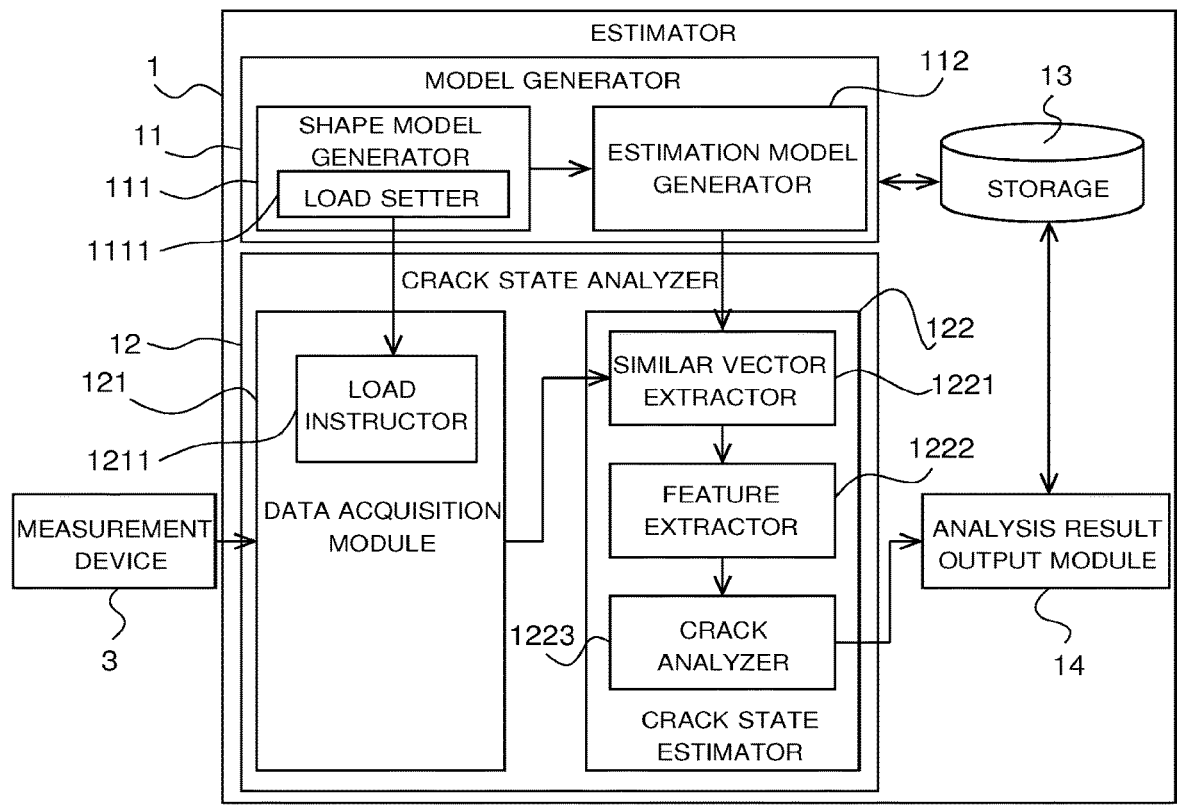
FIG. 32 is a block diagram for illustrating an example of a configuration of an estimation device according to a fifth embodiment of this disclosure.

FIG. 32 is a block diagram for illustrating an example of a configuration of an estimation device according to the fifth embodiment. As illustrated in FIG. 32, the shape model generator 111 includes a load setter 1111. The data acquisition module 121 includes a load instructor 1211. The load setter 1111 is configured to specify a size of a load to be applied to a structure, and a position of the structure at which the load is applied. The load instructor 1211 is configured to apply a load to a structure based on an instruction from the load setter 1111. With this, it is possible to measure the change of the observation surface 51 under a state in which a load is applied to a structure.

Figure 33:
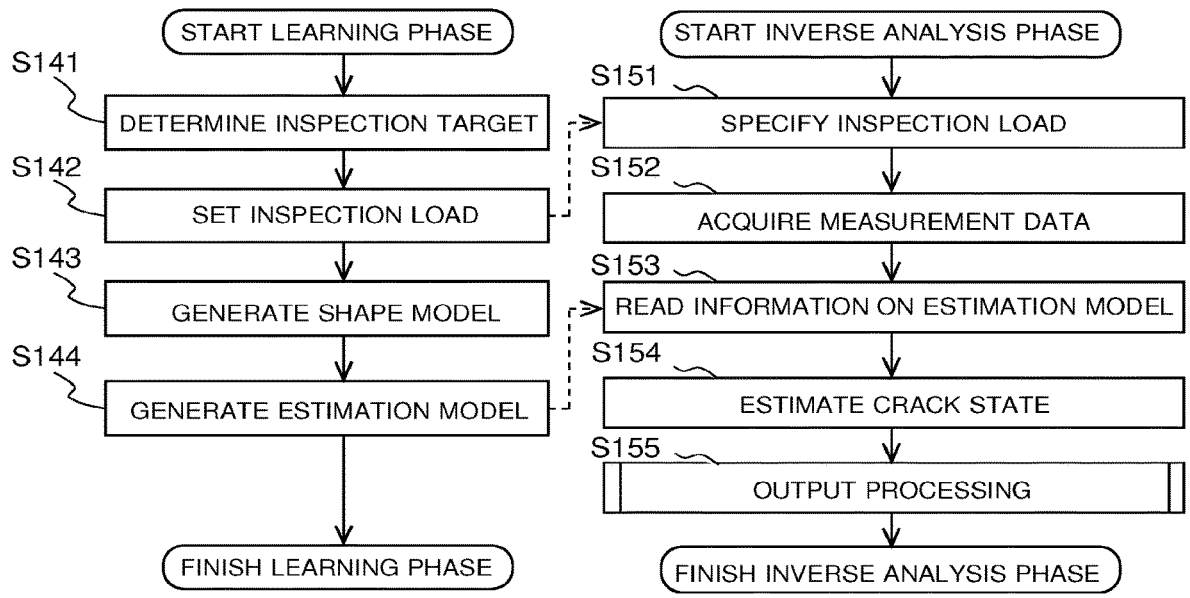
FIG. 33 is a flow chart for illustrating processing to be executed by the estimation device of FIG. 32.

FIG. 33 is a flow chart for illustrating processing to be executed by the estimation device of FIG. 32. The processing of from Step S141 to Step S144 is processing to be executed in a learning phase. The processing of from Step S151 to Step S155 is processing to be executed in an inverse analysis phase.

In Step S141, the estimator 1 determines an inspection target. The processing of Step S141 is processing that corresponds to the processing of from Step S11 to Step S14 of FIG. 13. Next, the processing of Step S141 advances to the processing of Step S142.

In Step S142, the estimator 1 sets an inspection load. The processing of Step S142 is processing that does not exist in the processing of from Step S11 to Step S26 of FIG. 13. Next, the processing of Step S142 advances to the processing of Step S143.

In Step S143, the estimator 1 generates a shape model. The processing of Step S143 corresponds to the processing of Step S15 of FIG. 13. Next, the processing of Step S143 advances to the processing of Step S144.

In Step S144, the estimator 1 generates an estimation model. The processing of Step S144 is processing that corresponds to the processing of from Step S16 to Step S23 of FIG. 13. Next, the processing of Step S144 finishes the learning phase.

In Step S151, the estimator 1 specifies the inspection load set in the learning phase. The processing of Step S151 is processing that does not exist in the processing of from Step S11 to Step S26 of FIG. 13. Next, the processing of Step S151 advances to the processing of Step S152.

In Step S152, the estimator 1 acquires measurement data. The processing of Step S152 is processing that corresponds to the processing of Step S24 of FIG. 13. Next, the processing of Step S152 advances to the processing of Step S153.

In Step S153, the estimator 1 reads information on the estimation model generated in the learning phase. The processing of Step S153 is processing that corresponds to the processing of Step S71 of FIG. 16. Next, the processing of Step S153 advances to the processing of Step S154.

In Step S154, the estimator 1 estimates a crack state. The processing of Step S154 is processing that corresponds to the processing of from Step S72 to Step S83 of FIG. 16. Next, the processing of Step S154 advances to the processing of Step S155.

That is, the processing of Step S153 and the processing of Step S154 are processing that corresponds to the processing of Step S25 of FIG. 13.

In Step S155, the estimator 1 executes output processing. The processing of Step S155 is processing that corresponds to the processing of Step S26 of FIG. 13. Next, the processing of Step S155 finishes the crack state analysis phase.

According to the above description, in the fifth embodiment, the measurement device 3 is configured to perform the measurement under a state in which a load is applied to the structure before the generation of the shape model.

With the configuration described above, a load can be applied to a structure at the time of inspecting the structure, and thus it is also possible to inspect a structure to which a load is not applied in advance. Therefore, it is possible to increase the number of structures that can be inspected.

Sixth Embodiment

In a sixth embodiment of this disclosure, description of configurations and functions that are the same as or equivalent to those of the first to fifth embodiments is omitted. The sixth embodiment is different from the first to fifth embodiments in terms of configuration in that details of the output processing are described. Other configurations of the sixth embodiment are similar to those of the first to fifth embodiments. That is, other configurations of the sixth embodiment are configurations and functions that are the same as or equivalent to those of the first to fifth embodiments. Thus, other configurations of the sixth embodiment are denoted by the same reference symbols as those of the first to fifth embodiments.

The analysis result output module 14 is configured to acquire information on the position of the crack 55, information on the size of the crack 55, information on a load applied to a structure, a physical property value of the structure, information on the size of the crack 55 that disables usage of the structure, and information on the position of the crack 55 that disables usage of the structure. In this case, the physical property value is a modulus of rigidity, for example.

The information on the position of the crack 55, the information on the size of the crack 55, and the information on a load applied to a structure can be acquired from the crack state analyzer 12. The physical property value of the structure, the information on the size of the crack 55 that disables usage of the structure, and the information on the position of the crack 55 that disables usage of the structure can be acquired from the storage 13. The information on the size of the crack 55 that disables usage of the structure and the information on the position of the crack 55 that disables usage of the structure are used as limit values.

In this case, various kinds of information stored in the storage 13 store information established at the stage of designing a product.

The analysis result output module 14 determines a remaining usage period based on the limit values and the amount of expansion of the crack 55 acquired based on those pieces of information.

The remaining usage period is determined based on the position of the crack 55, the size of the crack 55, the physical property value of the structure, the load applied to the structure, and a usage condition of the structure known in fracture mechanics. Further, the remaining usage period may be estimated based on chronological change of the size and position of the crack 55.

Figure 34:
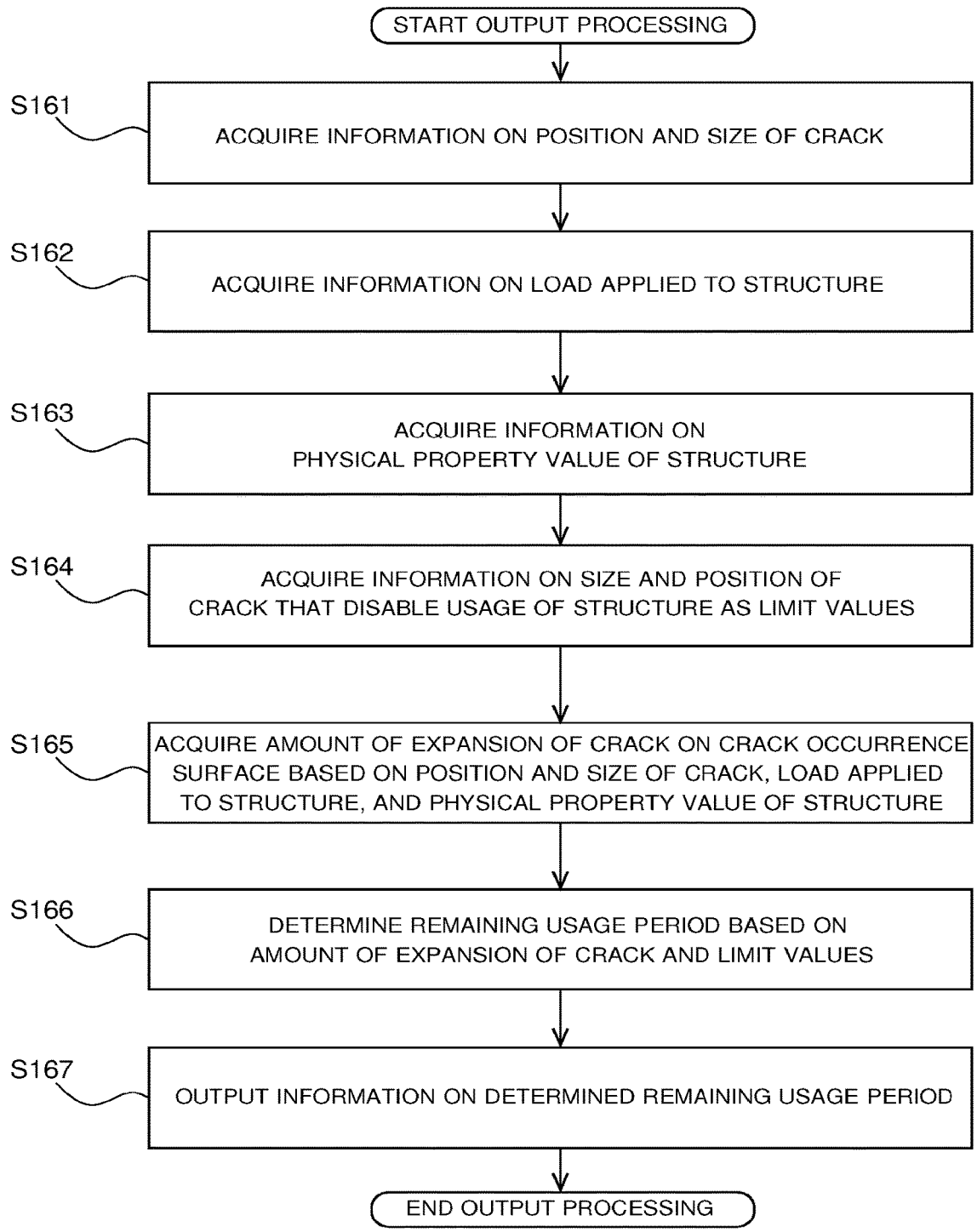
FIG. 34 is a flow chart for illustrating output processing of FIG. 13 and FIG. 33 in a sixth embodiment of this disclosure.

FIG. 34 is a flow chart for illustrating the output processing of FIG. 13 and FIG. 33 in the sixth embodiment.

In Step S161, the estimator 1 acquires the information on the position and size of the crack 55. Next, the processing of Step S161 advances to the processing of Step S162.

In Step S162, the estimator 1 acquires the information on a load applied to a structure. Next, the processing of Step S162 advances to the processing of Step S163.

In Step S163, the estimator 1 acquires information on the physical property value of the structure. Next, the processing of Step S163 advances to the processing of Step S164.

In Step S164, the estimator 1 acquires the information on the size and position of the crack 55 that disable usage of the structure as the limit values. Next, the processing of Step S164 advances to the processing of Step S165.

In Step S165, the estimator 1 acquires the amount of expansion of the crack 55 on the crack occurrence surface based on the position and size of the crack 55, the load applied to the structure, and the physical property value of the structure. Next, the processing of Step S165 advances to the processing of Step S166.

In Step S166, the estimator 1 determines the remaining usage period based on the amount of expansion of the crack 55 and the limit values. Next, the processing of Step S166 advances to the processing of Step S167.

In Step S167, the estimator 1 outputs the information on the determined remaining usage period. Next, the processing of Step S167 finishes the output processing.

According to the above description, in the sixth embodiment, first, the amount of expansion of the crack 55 on the crack occurrence surface is acquired based on the load applied to the structure and the physical value of the structure. Next, the remaining usage period of the structure is determined based on the amount of expansion of the crack 55 and the size and position of the crack 55 in the structure.

With the configuration described above, the remaining usage period is output based on the information on the estimated position and size of the crack 55, and thus it is possible to create a plan of operating the structure more specifically. For example, a period in which the structure is to be repaired and a period in which the structure is to be updated are clarified in advance, and thus it is possible to repair and update the structure in accordance with a plan.

Seventh Embodiment

In a seventh embodiment of this disclosure, description of configurations and functions that are the same as or equivalent to those of the first to sixth embodiments is omitted. The output processing in the seventh embodiment is different from the configuration in the first to sixth embodiments. Other configurations of the seventh embodiment are similar to those of the first to sixth embodiments. That is, other configurations of the seventh embodiment are configurations and functions that are the same as or equivalent to those of the first to sixth embodiments. Thus, other configurations of the seventh embodiment are denoted by the same reference symbols as those of the first to sixth embodiments.

The analysis result output module 14 acquires the information on the position and size of the crack 55 estimated by the crack analyzer 1223. The analysis result output module 14 acquires the information on the position and size of the crack 55 that disable usage of the structure stored in the storage 13 as limit values. When the estimated position and size of the crack 55 each exceed the limit value, the analysis result output module 14 generates an alarm urging stop of usage of the structure. Further, when the information on the remaining usage period can be acquired, the analysis result output module 14 notifies of the remaining usage period.

The alarm and notification are executed by using a sound, a character, flashing, or lighting, for example. The analysis result output module 14 includes at least one of a speaker, a liquid crystal display, or a light emitting device.

For example, when the analysis result output module 14 includes a speaker, the analysis result output module 14 can output an alarm or notification by a sound. Further, when the analysis result output module 14 includes a liquid crystal display, the analysis result output module 14 can output an alarm or notification by characters. Further, when the analysis result output module 14 includes a light emitting device, the analysis result output module 14 can output an alarm or notification by flashing or lighting.

Figure 35:
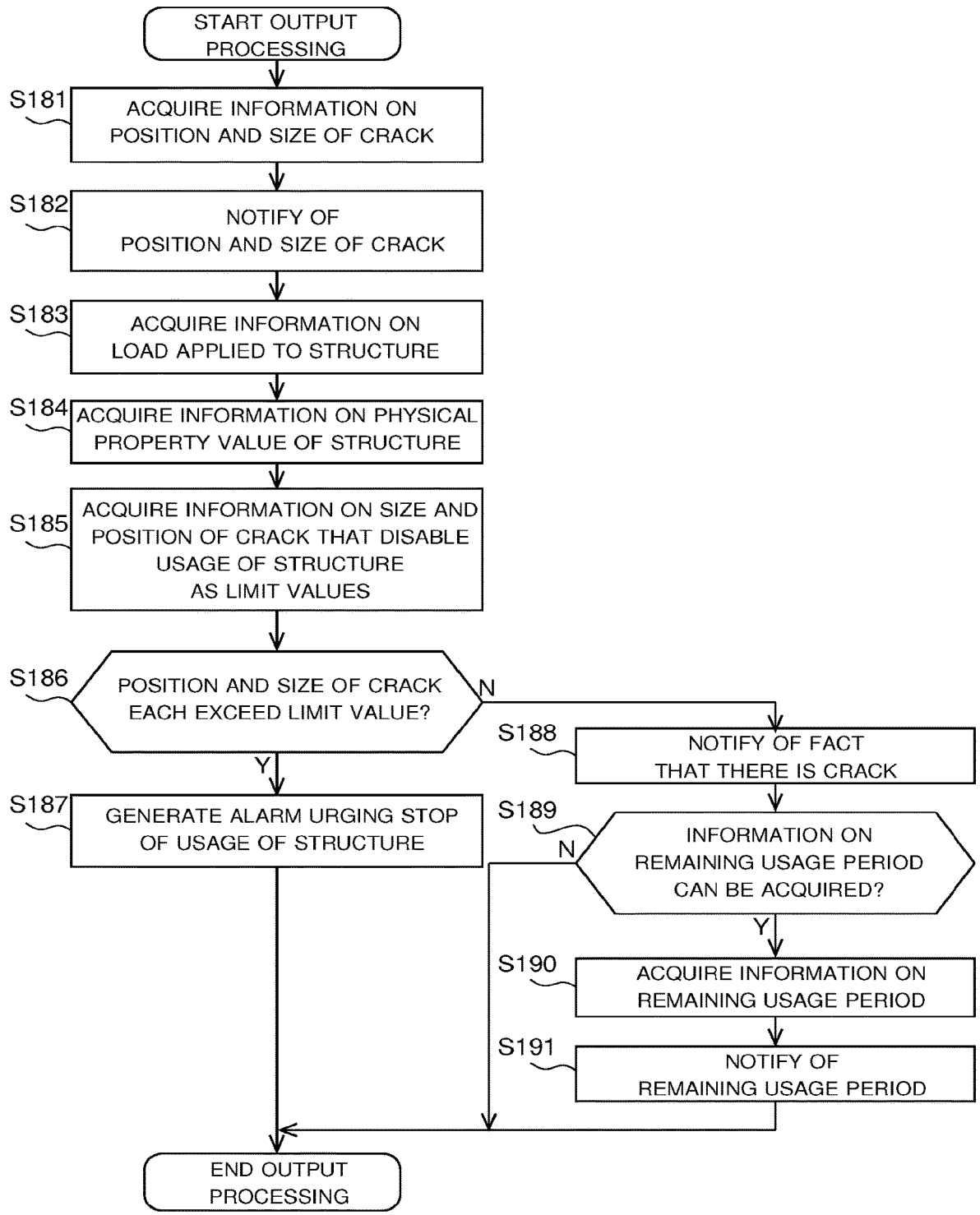
FIG. 35 is a flow chart for illustrating output processing of FIG. 13 and FIG. 33 in a seventh embodiment of this disclosure.

FIG. 35 is a flow chart for illustrating the output processing of FIG. 13 and FIG. 33 in the seventh embodiment.

In Step S181, the estimator 1 acquires the information on the position and size of the crack 55. Next, the processing of Step S181 advances to the processing of Step S182.

In Step S182, the estimator 1 notifies of the position and size of the crack 55. Next, the processing of Step S182 advances to the processing of Step S183.

In Step S183, the estimator 1 acquires the information on a load applied to a structure. Next, the processing of Step S183 advances to the processing of Step S184.

In Step S184, the estimator 1 acquires information on the physical property value of the structure. Next, the processing of Step S184 advances to the processing of Step S185.

In Step S185, the estimator 1 acquires the information on the position and size of the crack 55 that disable usage of the structure as the limit values. Next, the processing of Step S185 advances to the processing of Step S186.

In Step S186, the estimator 1 determines whether the position and size of the crack 55 each exceed the limit value. When the estimator 1 has determined that the position and size of the crack 55 each exceed the limit value, the processing of Step S186 advances to the processing of Step S187.

In Step S187, the estimator 1 generates an alarm urging stop of usage of the structure. Next, the processing of Step S187 finishes the output processing.

On the contrary, in Step S186, when the estimator 1 has determined that the position and size of the crack 55 do not each exceed the limit value, the processing of Step S186 advances to the processing of Step S188. In this case, when the estimator 1 has determined that the position and size of the crack 55 do not each exceed the limit value, this means that the estimator 1 has determined that the position and size of the crack 55 are each equal to or smaller than the limit value.

In Step S188, the estimator 1 notifies of the fact that the crack 55 exists. Next, the processing of Step S188 advances to the processing of Step S189.

In Step S189, the estimator 1 determines whether the information on the remaining usage period can be acquired. When the estimator 1 has determined that the information on the remaining usage period can be acquired, the processing of Step S189 advances to the processing of Step S190.

In Step S190, the estimator 1 acquires the information on the remaining usage period. Next, the processing of Step S190 advances to the processing of Step S191.

In Step S191, the estimator 1 notifies of the remaining usage period. Next, the processing of Step S191 finishes the output processing.

On the contrary, in Step S189, when the estimator 1 has determined that the information on the remaining usage period cannot be acquired, the processing of Step S189 finishes the output processing.

According to the above description, in the seventh embodiment, the notification urging stop of usage of the structure is output based on the amount of expansion of the crack 55 and the size and position of the crack 55 in the structure.

With the configuration described above, an operator of the structure can quickly determine to stop usage of the structure.

Eighth Embodiment

In an eighth embodiment of this disclosure, description of configurations and functions that are the same as or equivalent to those of the first to seventh embodiments is omitted. The candidate surface 53 determined in the eighth embodiment is different from the configuration of the first to seventh embodiments. Other configurations of the eighth embodiment are similar to those of the first to seventh embodiments. That is, other configurations of the eighth embodiment are configurations and functions that are the same as or equivalent to those of the first to seventh embodiments. Thus, other configurations of the eighth embodiment are denoted by the same reference symbols as those of the first to seventh embodiments.

Figure 36:
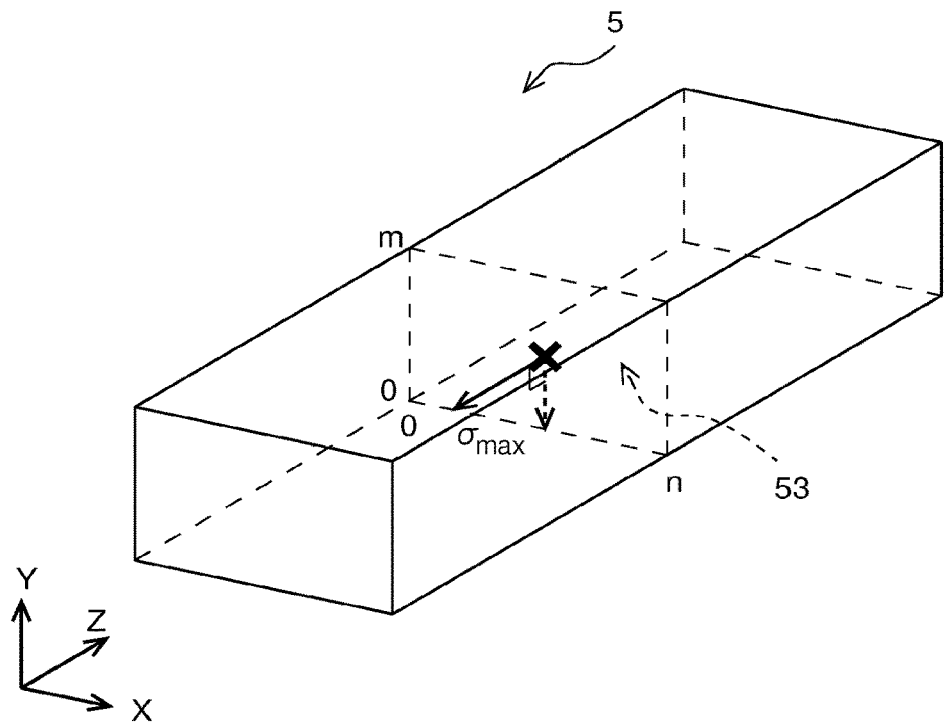
FIG. 36 is a diagram for illustrating a candidate surface in an eighth embodiment of this disclosure.

FIG. 36 is a diagram for illustrating the candidate surface 53 in the eighth embodiment. As illustrated in FIG. 36, when a point having the maximum stress is measured or acquired by structure analysis as the maximum stress $\sigma_{max}$, the model generator identifies the point having the maximum stress as an occurrence location of the crack 55. The model generator 11 determines, as the candidate surface 53, a surface that is perpendicular to the stress at the identified occurrence location and penetrates through a surface opposing the identified occurrence location.

Figure 37:
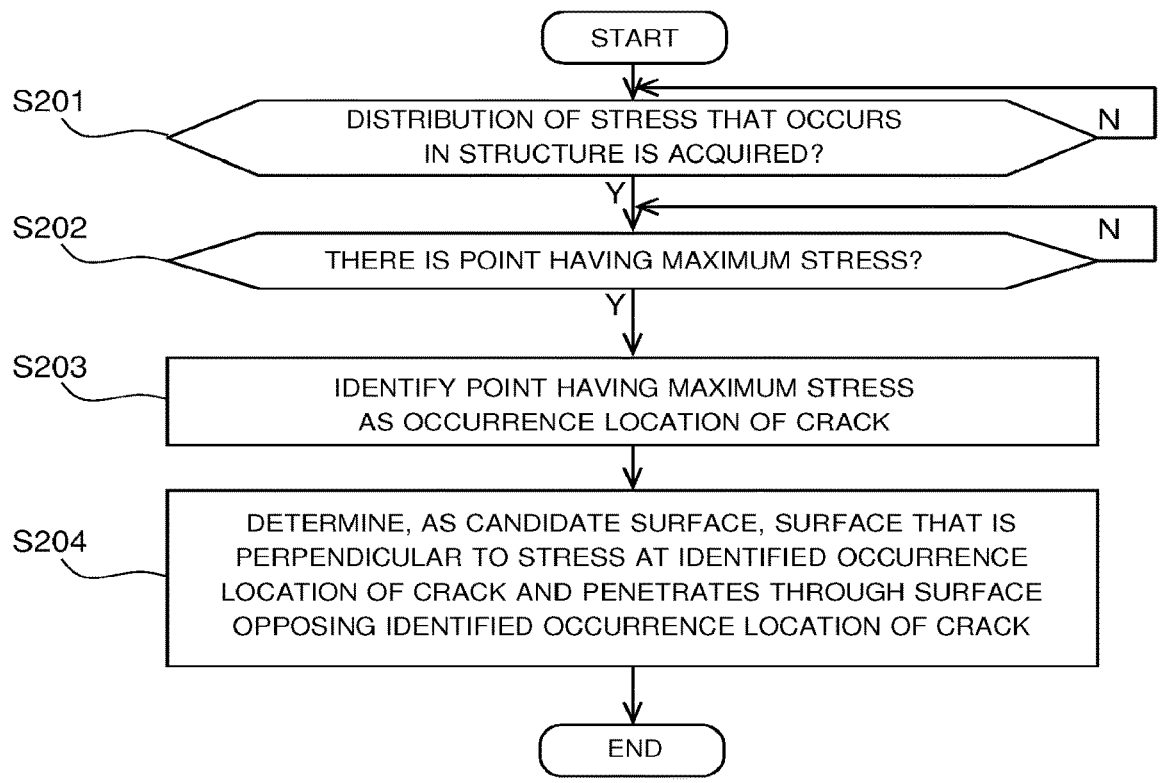
FIG. 37 is a flow chart for illustrating processing of determining the candidate surface of FIG. 36.

FIG. 37 is a flow chart for illustrating processing of determining the candidate surface 53 of FIG. 36.

In Step S201, the estimator 1 determines whether the distribution of stress that occurs in the structure is acquired. When the estimator 1 has determined that the distribution of stress that occurs in the structure is not acquired, the processing of Step S201 is repeated.

On the contrary, in Step S201, when the estimator 1 has determined that the distribution of stress that occurs in the structure is acquired, the processing of Step S201 advances to the processing of Step S202.

In Step S202, the estimator 1 determines whether there is a point having the maximum stress. When the estimator 1 has determined that there is no point having the maximum stress, the processing of Step S202 is repeated.

On the contrary, in Step S202, when the estimator 1 has determined that there is a point having the maximum stress, the processing of Step S202 advances to the processing of Step S203.

In Step S203, the estimator 1 identifies a point having the maximum stress as the occurrence location of the crack 55. Next, the processing of Step S203 advances to the processing of Step S204.

In Step S204, the estimator 1 determines, as the candidate surface 53, a surface that is perpendicular to the stress at the identified occurrence location of the crack 55 and penetrates through a surface opposing the identified occurrence location of the crack 55. Next, the processing of Step S204 finishes the processing.

According to the above description, in the eighth embodiment, a point having the maximum stress on the crack occurrence surface, which occurs depending on the boundary condition, is identified as the occurrence location of the crack 55.

With the configuration described above, it is possible to determine, as the candidate surface 53, a surface on which the crack 55 is liable to occur inside the structure. Therefore, it is possible to further improve the accuracy of estimating the crack 55.

Further, in each embodiment, a processing circuit for executing the estimation device is included. The processing circuit may be constructed by dedicated hardware or a central processing unit (CPU, which is also referred to as "processing unit", "arithmetic unit", "microprocessor", "microcomputer", "processor", or "DSP") for executing a program stored in a memory.

Figure 38:
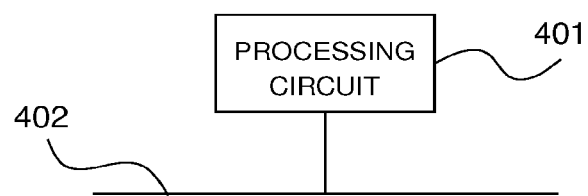
FIG. 38 is a diagram for illustrating an example of a hardware configuration.

FIG. 38 is a diagram for illustrating an example of a hardware configuration. In FIG. 38, a processing circuit 401 is connected to a bus 402. When the processing circuit 401 is dedicated hardware, the processing circuit 401 is, for example, a single circuit, a composite circuit, a programmed processor, an ASIC, an FPGA, or a combination thereof. Each function of the components of the estimation device may be implemented by the processing circuit 401, or the functions of those components may be collectively implemented by the processing circuit 401.

Figure 39:
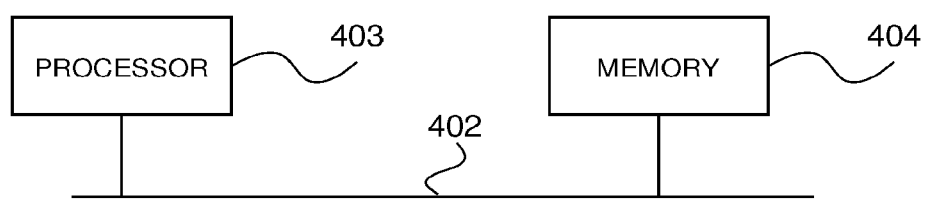
FIG. 39 is a diagram for illustrating another example of the hardware configuration.

FIG. 39 is a diagram for illustrating another example of the hardware configuration. In FIG. 39, a processor 403 and a memory 404 are connected to the bus 402. When the processing circuit is a CPU, the function of each unit of the estimation device is implemented by a combination of software, firmware, or a combination of software and firmware. The software or firmware is described as a program, and is stored into the memory 404. The processing circuit reads out a program stored in the memory 404 and executes the program to implement the function of each component. That is, the estimation device includes the memory 404 for storing a program to be executed by the processing circuit so that steps are consequently executed. Further, those programs can be regarded as programs for causing a computer to execute a procedure or method to be executed. In this case, the memory 404 is a volatile or non-volatile semiconductor memory such as a RAM, a ROM, a flash memory, an EPROM, or an EEPROM, or is a magnetic disk, a flexible disk, an optical disc, a compact disc, a mini disc, or a DVD.

A part of the function of each component of the estimation device may be implemented by dedicated hardware, and another part of the function of each component may be implemented by software or firmware. For example, a processing circuit being dedicated hardware can implement the model generator 11 among the functions. Further, a processing circuit can read out a program stored in the memory 404 and execute the program to implement the crack analyzer 1223 among the functions.

In this way, the processing circuit can implement each of the above-mentioned functions by hardware, software, firmware, or a combination thereof.

In the first to eighth embodiments, description has been made of an example in which the candidate surface 53 is divided into lattices to be set as the sections A, and the observation surface 51 is divided into lattices to be set as the elements B. However, this disclosure is not particularly limited thereto. For example, the candidate surface 53 may be divided into trapezoid shapes to be set as the sections A, and the observation surface 51 may be divided into trapezoid shapes to be set as the sections B.

Further, in the first embodiment, description has been given of an example of using a strain gauge as the measurement device 3. However, this disclosure is not particularly limited thereto. For example, an optical device, for example, a digital camera, and a device that has installed therein software for analyzing image information acquired by the optical device may be used as the measurement device 3. In this case, this device executes an image analysis algorithm by a digital image correlation method to measure strain of the surface of a structure in a non-contact manner.

Further, in the eighth embodiment, description has been given of an example in which the maximum stress $\sigma_{max}$ is determined as a result of measurement or structure analysis. However, the maximum stress $\sigma_{max}$ is likely to occur at a location to which a boundary condition is set. Thus, setting of a boundary condition may be reconsidered by focusing on the occurrence location of the maximum stress $\sigma_{max}$.

What is claimed is:

1. An estimation device to estimate a state of a crack on a physical structure within an electric machine, the estimation device comprising:
   a measurement device configured to set an observation surface on a surface of the physical structure within the electric machine as a measurement surface to measure a change of the measurement surface as a measurement surface change vector; and
   an estimator, implemented by processing circuitry, configured to estimate the crack on the physical structure within the electric machine based on a change of the measurement surface measured by the measurement device, by estimating a change of a crack occurrence surface by determining a candidate surface, which is inside the physical structure within the electric machine and assumed to have the crack, as the crack occurrence surface, based on: a coefficient vector forming a sparse solution acquired by solving a norm minimization problem by setting, as parameters, the measurement surface change vector and a part of an estimation model, which is generated from a shape model obtained by modeling a shape of the physical structure within the electric machine; and another part of the estimation model.

2. The estimation device according to claim 1, wherein the estimation device includes:
   a model generator configured to perform structure analysis based on a boundary condition set in advance for the shape model generated based on the measurement surface and the crack occurrence surface, to thereby generate the estimation model including a plurality of measurement surface estimated change vectors each estimating a change of the measurement surface and a plurality of crack occurrence surface estimated change vectors each estimating a displacement change of the crack occurrence surface as the change of the crack occurrence surface;
   a similar vector extractor configured to:
      set, as a measurement surface similar change vector, a measurement surface estimated change vector having a similarity with the measurement surface change vector higher than a reference similarity set in advance;
      set, as a crack occurrence surface similar change vector, a crack occurrence surface estimated change vector corresponding to the measurement surface similar change vector; and
      extract the measurement surface similar change vector serving as the part of the estimation model and the crack occurrence surface similar change vector serving as the another part of the estimation model;
   a feature extractor configured to extract the coefficient vector by solving an L1 norm minimization problem as the norm minimization problem based on the measurement surface change vector and the measurement surface similar change vector; and
   a crack analyzer configured to estimate a change in distribution of displacement changes of the crack occurrence surface based on the coefficient vector and the crack occurrence surface similar change vector.

3. The estimation device according to claim 2, wherein the similar vector extractor is configured to use a cosine similarity as the similarity.

4. The estimation device according to claim 2, wherein the model generator is configured to:
   divide the crack occurrence surface into a plurality of sections;
   set a plurality of nodes forming the respective plurality of sections as the crack; and
   estimate a displacement change of each of the plurality of nodes as the crack occurrence surface estimated change vector.

5. The estimation device according to claim 4, wherein the model generator is configured to focus on displacement changes of a plurality of nodes forming a plurality of sections, which are continuously adjacent to one another in a partial region of the crack occurrence surface among the plurality of sections.

6. The estimation device according to claim 2, wherein the model generator is configured to model the shape model as a model in a cylindrical coordinate system.

7. The estimation device according to claim 2, wherein the measurement device is configured to perform the measurement under a state in which a load is applied to the physical structure within the electric machine before the generation of the shape model.

8. The estimation device according to claim 2, wherein the model generator is configured to estimate a change in load of the crack occurrence surface as the change of the crack occurrence surface.

9. The estimation device according to claim 1, wherein the measurement device is configured to measure, as the change of the measurement surface, at least one of a displacement change, a strain change, or an angle change of the measurement surface.

10. An estimation method to estimate a state of a crack on a physical structure within an electric machine, the estimation method comprising:
setting, by a measurement device, an observation surface on a surface of the physical structure within the electric machine as a measurement surface to measure a change of the measurement surface as a measurement surface change vector; and
estimating, by processing circuitry, the crack on the physical structure within the electric machine based on a change of the measurement surface measured by the measurement device, by estimating a displacement change of a crack occurrence surface, which is inside the physical structure within the electric machine based on: a coefficient vector forming a sparse solution acquired by solving a norm minimization problem by setting, as parameters, the measurement surface change vector and a part of an estimation model, which is generated from a shape model obtained by modeling a shape of the physical structure within the electric machine; and another part of the estimation model.

11. The estimation method according to claim 10, wherein the estimating a displacement change includes:
performing structure analysis based on a boundary condition set in advance for the shape model generated based on the measurement surface and the crack occurrence surface, to thereby generate the estimation model including a plurality of measurement surface estimated change vectors each estimating a change of the measurement surface and a plurality of crack occurrence surface estimated change vectors each estimating the displacement change of the crack occurrence surface;
setting, as a measurement surface similar change vector, a measurement surface estimated change vector having a similarity with the measurement surface change vector higher than a reference similarity set in advance, setting, as a crack occurrence surface similar change vector, a crack occurrence surface estimated change vector corresponding to the measurement surface similar change vector and extracting the measurement surface similar change vector serving as the part of the estimation model and the crack occurrence surface similar change vector serving as the another part of the estimation model;
extracting the coefficient vector by solving an L1 norm minimization problem as the norm minimization problem based on the measurement surface change vector and the measurement surface similar change vector; and
estimating a distribution of displacement changes of the crack occurrence surface based on the coefficient vector and the crack occurrence surface similar change vector.

12. The estimation method according to claim 11, further comprising:
acquiring an amount of expansion of the crack on the crack occurrence surface based on a load applied to the physical structure within the electric machine and a physical property value of the physical structure within the electric machine; and
determining a remaining usage period of the physical structure within the electric machine based on the amount of expansion of the crack and a size and a position of the crack in the physical structure within the electric machine.

13. The estimation method according to claim 12, further comprising outputting a notification urging stop of usage of the physical structure within the electric machine based on the amount of expansion of the crack and the size and the position of the crack in the physical structure within the electric machine.

14. The estimation method according to claim 12, further comprising identifying a point having a maximum stress on the crack occurrence surface, which occurs depending on the boundary condition, as an occurrence location of the crack.

15. An estimation device to estimate a state of a crack on a physical structure within an electric machine, the estimation device comprising:
a measurement device configured to set an observation surface on a surface of the structure as a measurement surface to measure a change of the measurement surface as a measurement surface change vector;
a model generator, implemented by processing circuitry, configured to perform structure analysis based on a boundary condition set in advance for the shape model generated based on the measurement surface and crack occurrence surface, to thereby generate the estimation model including a plurality of measurement surface estimated change vectors each estimating a change of the measurement surface and a plurality of crack occurrence surface estimated change vectors each estimating a displacement change of the crack occurrence surface as the change of the crack occurrence surface;
a similar vector extractor, implemented by the processing circuitry, configured to:
set, as a measurement surface similar change vector, a measurement surface estimated change vector having a similarity with the measurement surface change vector higher than a reference similarity set in advance;
set, as a crack occurrence surface similar change vector, a crack occurrence surface estimated change vector corresponding to the measurement surface similar change vector; and
extract the measurement surface similar change vector serving as the part of the estimation model and the crack occurrence surface similar change vector serving as the another part of the estimation model;
a feature extractor, implemented by the processing circuitry, configured to extract the coefficient vector by solving an L1 norm minimization problem as the norm minimization problem based on the measurement surface change vector and the measurement surface similar change vector;

a crack analyzer, implemented by the processing circuitry, configured to estimate a change in distribution of displacement changes of the crack occurrence surface based on the coefficient vector and the crack occurrence surface similar change vector;

an estimator, configured to acquire position and size of the crack on the crack occurrence surface, based on distribution change of the displacement change of the crack occurrence surface by estimating a change of a crack occurrence surface, the load applied to the structure, and the physical property value of the structure, from a change of a measurement surface measured by the measurement device; and an output module, configured to output the remaining usage period generated based on the position and the size of the crack acquired by the estimator or a notification urging stop of usage of the structure generated by the remaining usage period, into a speaker, a liquid crystal display, or a light emitting device.

\* \* \* \* \*